United States Patent
Aoyama et al.

(10) Patent No.: US 12,552,776 B2
(45) Date of Patent: Feb. 17, 2026

(54) CRYSTALLINE FORMS

(71) Applicant: RaQualia Pharma Inc., Aichi (JP)

(72) Inventors: Hideyuki Aoyama, Aichi (JP); Toyoharu Numata, Aichi (JP); Masaki Sudo, Aichi (JP); Yasuhiro Iwata, Aichi (JP)

(73) Assignee: RaQualia Pharma Inc., Aichi (JP)

( * ) Notice: Subject to any disclaimer, the term of this patent is extended or adjusted under 35 U.S.C. 154(b) by 239 days.

(21) Appl. No.: 18/291,712

(22) PCT Filed: Aug. 1, 2022

(86) PCT No.: PCT/JP2022/029430
§ 371 (c)(1),
(2) Date: Jan. 24, 2024

(87) PCT Pub. No.: WO2023/008585
PCT Pub. Date: Feb. 2, 2023

(65) Prior Publication Data
US 2024/0351998 A1   Oct. 24, 2024

Related U.S. Application Data

(60) Provisional application No. 63/227,692, filed on Jul. 30, 2021.

(51) Int. Cl.
*C07D 401/14* (2006.01)
*A61K 31/4545* (2006.01)

(52) U.S. Cl.
CPC ........ *C07D 401/14* (2013.01); *A61K 31/4545* (2013.01)

(58) Field of Classification Search
None
See application file for complete search history.

(56) References Cited

U.S. PATENT DOCUMENTS

| | | | |
|---|---|---|---|
| 2009/0018158 A1 | 1/2009 | Haruta et al. | |
| 2011/0312933 A1* | 12/2011 | Sudo | A61P 35/00 514/253.09 |
| 2012/0302540 A1 | 11/2012 | Ambarkhane et al. | |
| 2013/0296358 A1 | 11/2013 | Ambarkhane | |
| 2013/0331369 A1 | 12/2013 | Ambarkhane et al. | |
| 2014/0187583 A1 | 7/2014 | Numata et al. | |
| 2017/0081318 A1 | 3/2017 | Numata et al. | |

FOREIGN PATENT DOCUMENTS

| | | |
|---|---|---|
| JP | 2006-249089 | 9/2006 |
| JP | 2014-513665 | 6/2014 |
| JP | 2015-525202 | 9/2015 |
| JP | 2017-515868 | 6/2017 |
| WO | 2010/098145 | 9/2010 |

OTHER PUBLICATIONS

International Preliminary Report on Patentability issued Feb. 8, 2024 in International (PCT) Application No. PCT/JP2022/029430.
Notice of Reasons for Refusal dated Aug. 19, 2025 in corresponding Japanese Patent Application No. 2024-503927, with English language translation.
Kazuhide Ashizawa et al., "Science of Pharmaceutical Polymorphism and Crystallization", Maruzen Planet Co., Ltd., 2002, pp. 305-317.
Hiroshi Nagase, "Latest Medicinal Chemistry", vol. 2, Technomics Co., Ltd., 1999, pp. 347-354.
Noriaki Hirayama, "Organic Compound Crystal Production Handbook—Principle and Know-how-", 2008, pp. 36-43.
Kazuhide Ashiawa, "Optimizing salts and crystal forms and crystallization technology", Pharm Tech Japan, 2002, vol. 18, No. 10, pp. 1-17.
International Search Report dated Sep. 20, 2022 in International (PCT) Application No. PCT/JP2022/029430.
Stephen M. Berge et al., "Pharmaceutical Salts", Journal of Pharmaceutical Sciences, 1977, vol. 66, No. 1, pp. 1-19.
Stephen Bryne et al., "Pharmaceutical Solids: A Strategic Approach to Regulatory Considerations", Pharmaceutical Research, 1995, vol. 12, No. 7, pp. 945-954.
Galen Perdikis et al., "Gastroesophageal Reflux Disease Is Associated With Enteric Hormone Abnormalities", The American Journal of Surgery, 1994, vol. 167, pp. 186-192.
Gareth J. Sanger, et al., "Ghrelin and motilin receptors as drug targets for gastrointestinal disorders", Nat. Rev. Gastroenterol Hepatol, 2016, vol. 13, pp. 38-48.
Shyam S. Sharma et al., "Effect of Oral Erythromycin on Colonic Transit in Patients with Idiopathic Constipation A Pilot Study", Digestive Diseases and Sciences, vol. 40, No. 11 (Nov. 1995), pp. 2446-2449.
Walter E. Longo et al., "Prokinetic Agents for Lower Gastrointestinal Motility Disorders", Dis. Colon Rectum, Jul. 1993, vol. 36, No. 7, pp. 696-708.
Stephen R. Byrn et al., "Solid-State Chemistry of Drugs", Second Edition, Chapter 1, pp. 3-43 and Chapter 22, pp. 461-503 (2001).
Herbert A. Lieberman et al., Pharmaceutical Dosage Forms: Tablets, vol 1, Second Edition, pp. 1-73.

* cited by examiner

Primary Examiner — Craig D Ricci
(74) Attorney, Agent, or Firm — Wenderoth, Lind & Ponack, L.L.P.

(57) ABSTRACT

The present invention relates to novel crystalline forms of (R)—N—((S)-1-(4-(3,3-dimethyl-2-oxoindolin-1-yl)piperidin-1-yl)-1-oxo-4-phenylbutan-2-yl)piperidine-3-carboxamide hydrochloride (HCl-salt), and to pharmaceutical compositions thereof, process for preparation or isolation of such crystalline forms and compositions, and to methods of using such crystalline forms and compositions in the treatment of various diseases or disorders which are mediated by motilin receptor activity.

13 Claims, 5 Drawing Sheets

[Fig. 1]
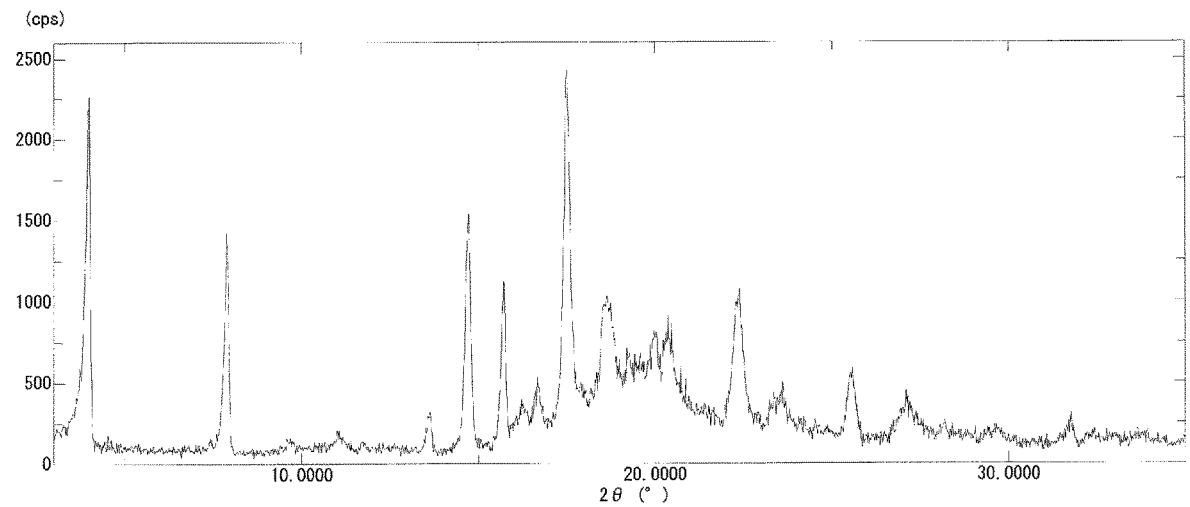
[Fig. 2]
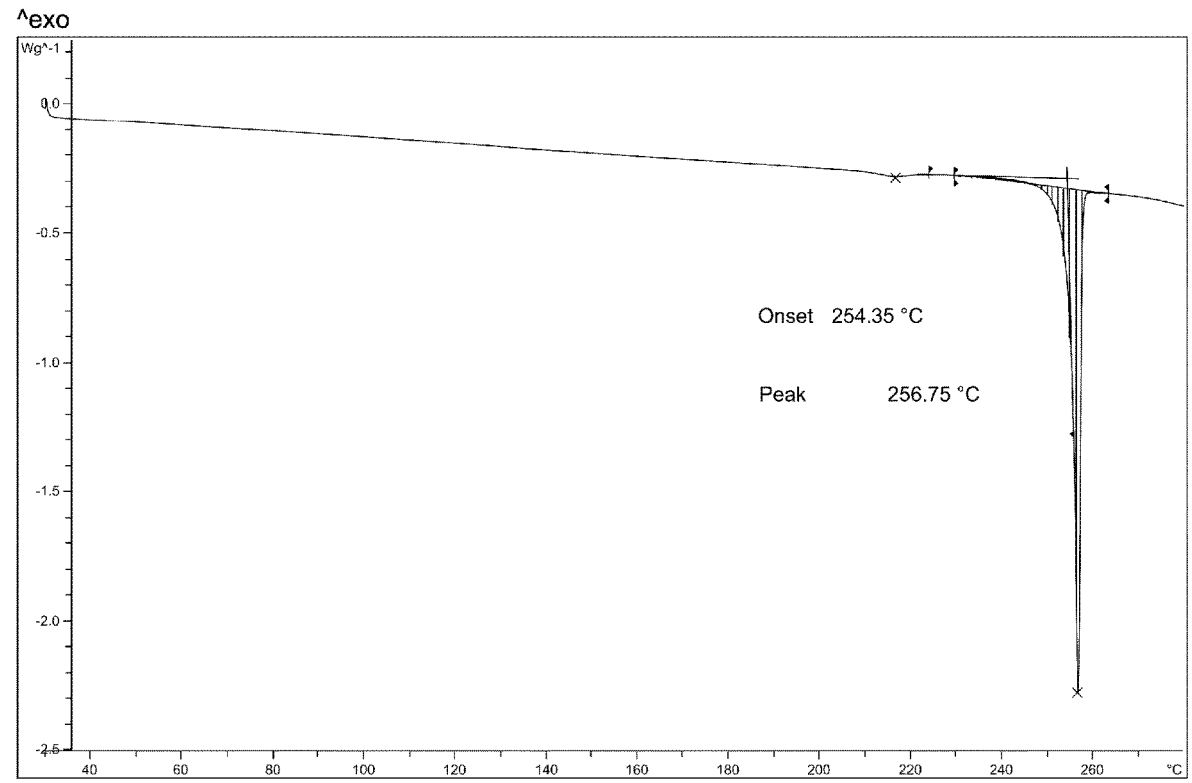

[Fig. 3]
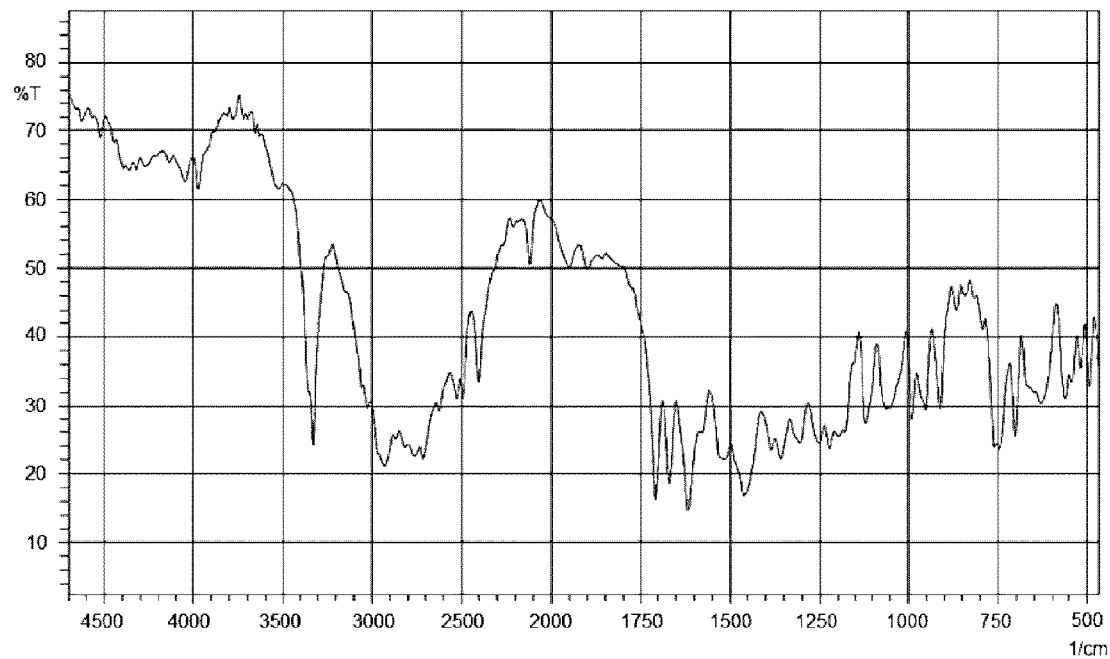
[Fig. 4]
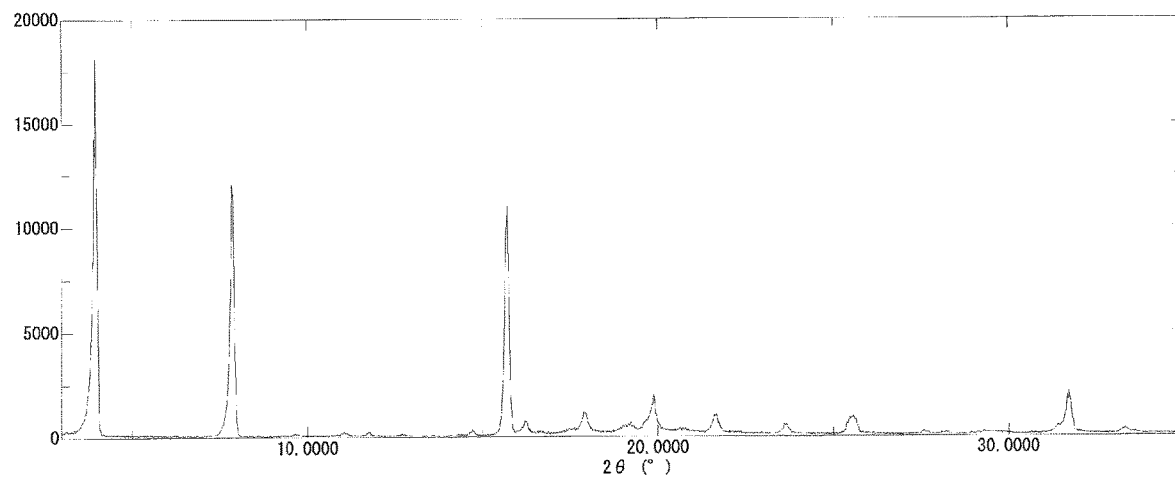

[Fig. 5]
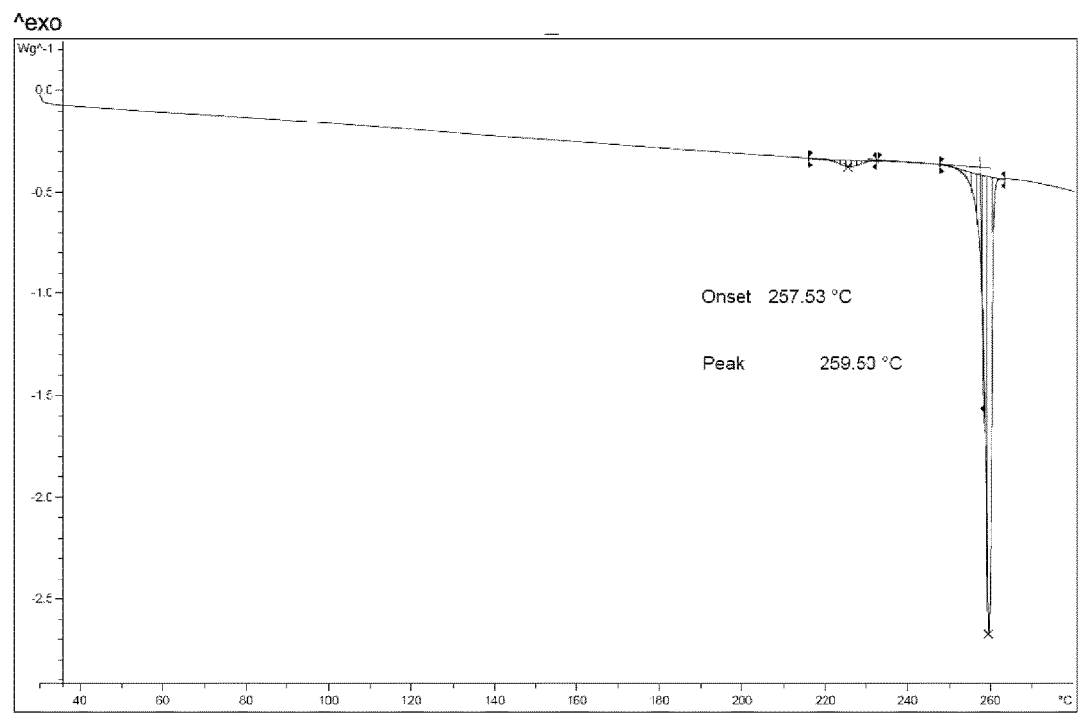
[Fig. 6]
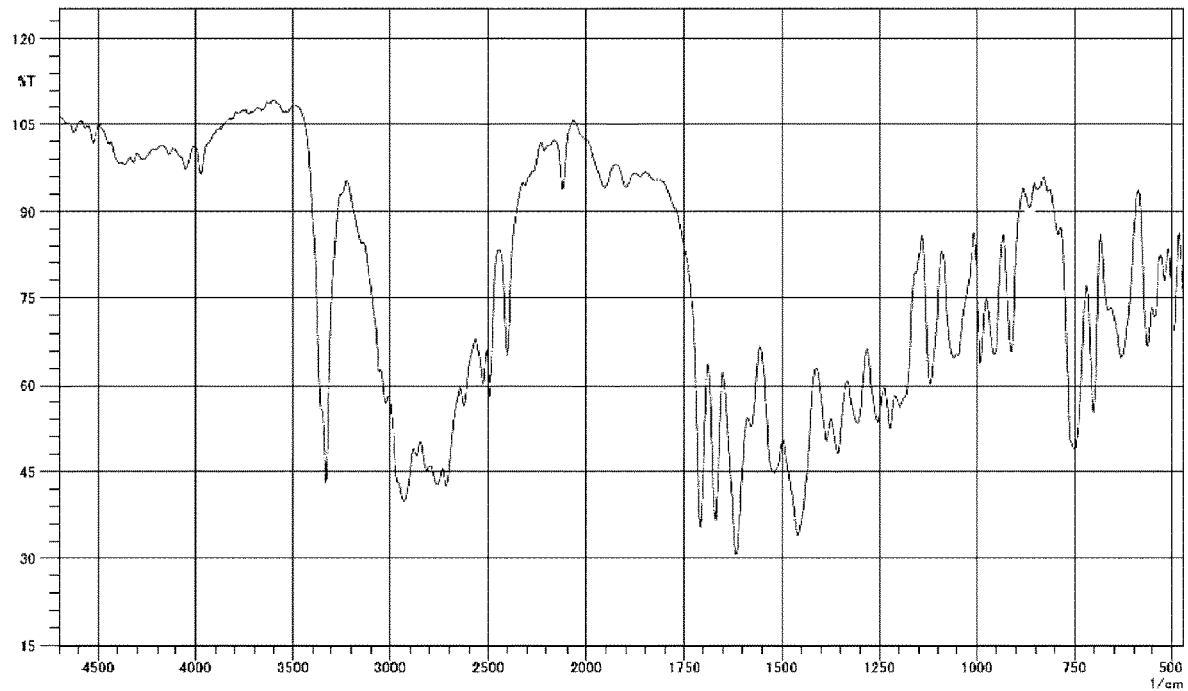

[Fig. 7]
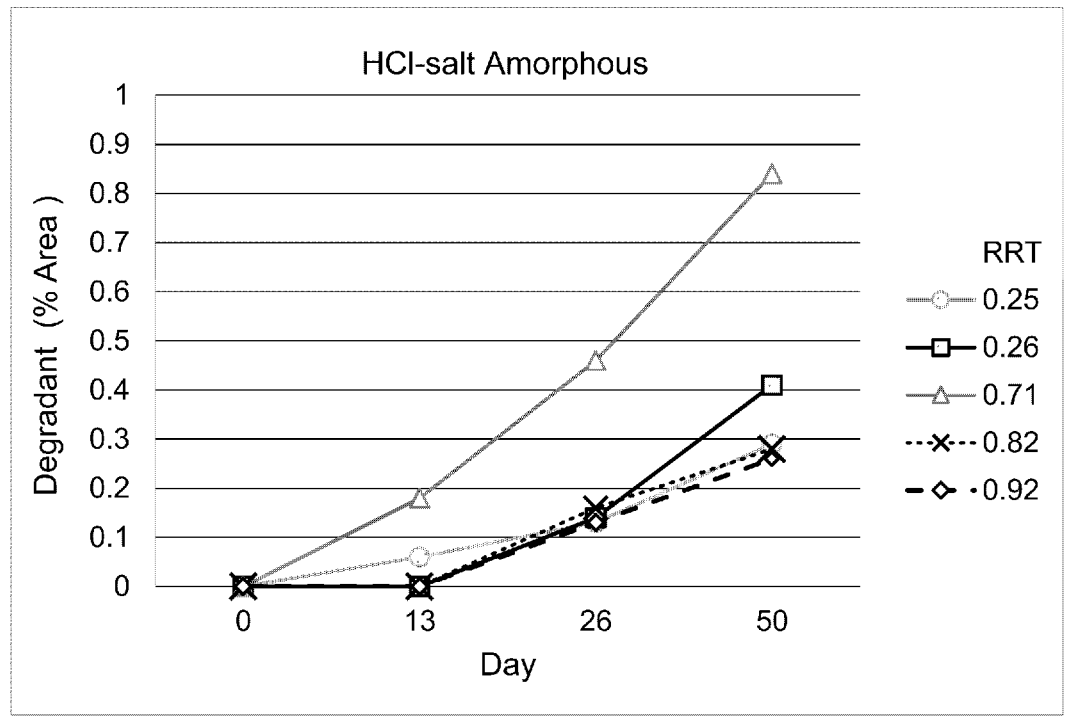
[Fig. 8]
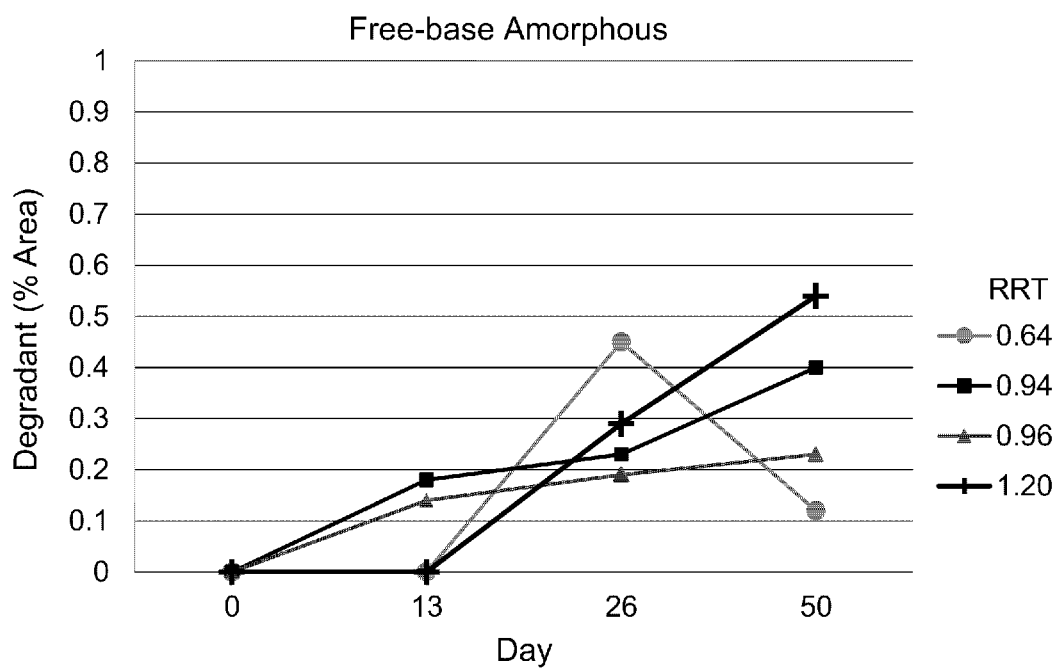

[Fig. 9]
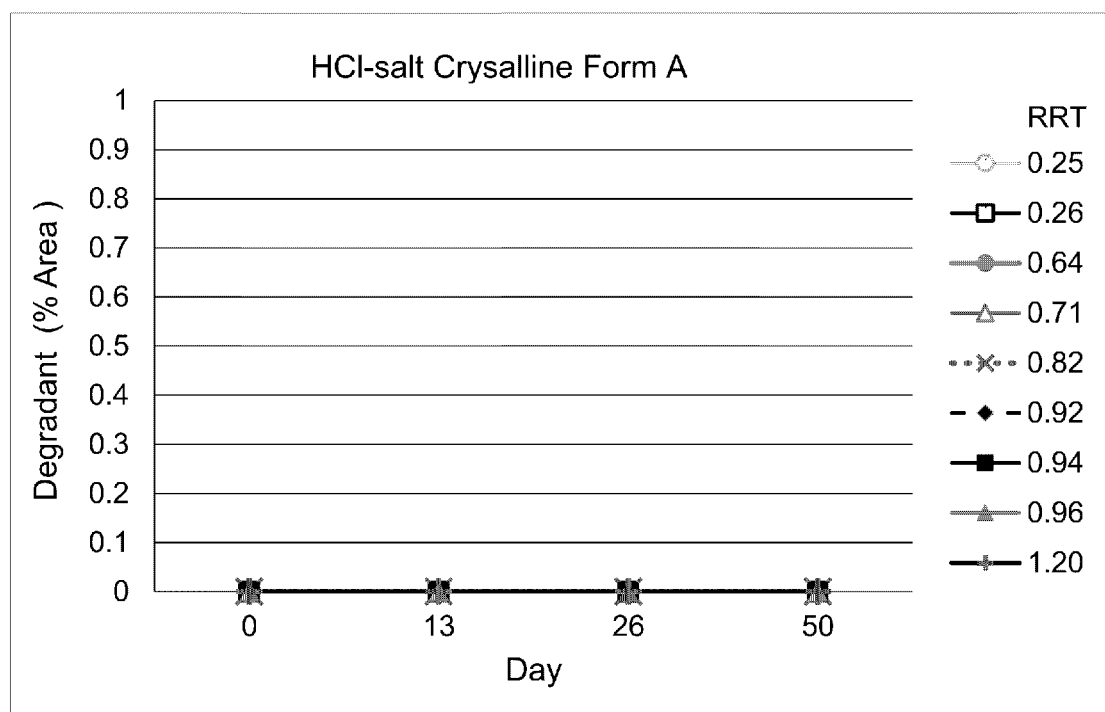

CRYSTALLINE FORMS

TECHNICAL FIELD

The present invention relates to novel crystalline forms of (R)—N—((S)-1-(4-(3,3-dimethyl-2-oxoindolin-1-yl)piperidin-1-yl)-1-oxo-4-phenylbutan-2-yl)piperidine-3-carboxamide hydrochloride (HCl-salt), to pharmaceutical compositions thereof, process for preparation or isolation of such crystalline forms and compositions, to methods of using such crystalline forms and compositions in the treatment of various diseases or disorders which are mediated by motilin receptor activity.

BACKGROUND ART

The compound (R)—N—((S)-1-(4-(3,3-dimethyl-2-oxoindolin-1-yl)piperidin-1-yl)-1-oxo-4-phenylbutan-2-yl)piperidine-3-carboxamide is disclosed in WO2010/098145 (PL 1) as a motilin receptor agonist, which is useful in the treatment of disease conditions mediated by motilin receptor activity; in particular motilin receptor agonistic activity, such as gastroesophageal reflux disorders; functional dyspepsia; irritable bowel syndrome; constipation; intestinal pseudo-obstruction; paralytic ileus following surgery or other manipulation; emesis; gastric stasis or hypomotility caused by various diseases such as diabetes and/or by the administration of other drugs, or in enterally fed patients; Crohn's disease; colitis; cachexia associated with advanced diseases such as cancer and/or the treatment thereof; appetite/metabolism related cachexia; and other disorders such as incontinence (see PL 1 and NPL 1 to 4).

Simply a white solid has been produced in the previously known methods of preparing
  (R)—N—((S)-1-(4-(3,3-dimethyl-2-oxoindolin-1-yl)piperidin-1-yl)-1-oxo-4-phenylbutan-2-yl)piperidine-3-carboxamide, described in PL 1. A generic disclosure of pharmaceutically-acceptable salts of
  (R)—N—((S)-1-(4-(3,3-dimethyl-2-oxoindolin-1-yl)piperidin-1-yl)-1-oxo-4-phenylbutan-2-yl)piperidine-3-carboxamide of the instant application is disclosed, and the free base of the compound of the instant invention is disclosed and claimed in PL 1. Thus any crystalline forms or salts of the compound have been neither practically described nor synthesized in prior art.

CITATION LIST

Patent Literature

{PL 1} WO2010/098145

Non Patent Literature

{NPL 1} Perdikis G, et al., Am J Surg, 1994, 167, 186-192
{NPL 2} Sanger G J, et al., Nat Rev Gastroenterol Hepatol, 2016, 13, 38-48
{NPL 3} Sharma S S, et al., Dig Dis Sci, 1995, 40, 2446-2449
{NPL 4} Logo W E, et al., Dis Colon Rectum, 1993, 36, 696-708
{NPL 5} Byrn S R, et al., Solid-State Chemistry of Drugs 2nd ed., pp 3-43 and 461-503, 1999, Indiana, SSCI, Inc.
{NPL 6} Lieberman H A, et al., Pharmaceutical Dosage Forms: Tablets, Vol. 1, 2nd ed., pp 1-73, 1989, New York, Marcel Dekker, Inc.

SUMMARY OF INVENTION

Technical Problem

As well-known by skilled in the art, it has been a desirable goal to find or prepare a crystalline, crystalline form or a salt form in drug development from the various viewpoints including formulation and manufacturing of the drug (See NPL 5 and NPL 6). In spite of the numerous advantages associated with crystalline forms and salt forms, developing a stable crystalline and/or salt are not always feasible.

According to the line, great efforts have been made to find or prepare a crystalline or crystalline form of (R)—N—((S)-1-(4-(3,3-dimethyl-2-oxoindolin-1-yl)piperidin-1-yl)-1-oxo-4-phenylbutan-2-yl)piperidine-3-carboxamide since the said compound was disclosed in 2010 (WO2010/098145) by RaQualia Pharma Inc. For instance, esters such as ethyl acetate (EtOAc), alcohols such as methanol, ethanol and isopropyl alcohol, nitriles such as acetonitrile (MeCN), ethers such as diethyl ether, diisopropyl ether, t-butyl methyl ether (MTBE), and cyclopentyl methyl ether (CPME), cyclic ether such as 2-Methyltetrahydrofuran (2-Me THF) and tetrahydropyran, ketones such as acetone and methyl ethyl ketone (MEK), halogenated hydrocarbons such as dichloromethane and chloroform were used as recrystallization solvents, but all of them resulted in failure.

Furthermore, the contract research outsourcing, which specializes in crystallization trust service, was not able to obtain any crystalline form even if it examined intensively. For instance, ethyl acetate, acetonitrile, tetrahydrofuran (THF), diisopropyl ether, CPME, toluene, the mixed solution such as ethyl acetate/heptane, ethyl acetate/MTBE, toluene/heptane and ethyl acetate/CPME were used as recrystallization solvents, but all of them resulted in failure.

In spite of such great efforts, no pharmaceutically suitable crystalline forms of the said free base compound have been identified. The free-base compound is only available in amorphous state (hereinafter referred to as "Free-base Amorphous"), so far.

As a method for obtaining the pharmaceutically suitable crystalline forms by RaQualia Pharma Inc, a method of adding acidic counter ions such as hydrochloric acid, tartaric acid, citric acid, malic acid, succinic acid, phosphoric acid, benzoic acid, benzenesulfonic acid, ethanesulfonic acid, lactic acid, naphthalene-2-sulfonic acid, pamoic acid, sulfuric acid and so on to various solvent system as salt screen were tried for the first trial, but no pharmaceutically suitable crystalline salt forms of the said compound were obtained.

Finally, after an exhaustive and careful study, the inventors of the present invention have managed to find out a condition of preparing the crystalline, which can provide the long-awaited, pharmaceutically suitable crystalline form of the said compound as hydrochloride, i.e., (R)—N—((S)-1-(4-(3,3-dimethyl-2-oxoindolin-1-yl)piperidin-1-yl)-1-oxo-4-phenylbutan-2-yl)piperidine-3-carboxamide hydrochloride Crystalline Form A (hereinafter referred to as "HCl-salt Crystalline Form A").

Further, the contract research outsourcing, which have scientific expertise and technology to provide a complete suite of solutions in discovery, development and manufacturing, was not able to identify other polymorph forms than HCl-salt Crystalline Form A in the preliminary polymorph screen. And they were not able to obtain another more pharmaceutically suitable crystalline salt form than HCl-salt Crystalline Form A in the salt screen. For instance, selection of counter ions and salt formation conditions were executed, but the majority of counter ions did not provide filterable solids as disclosed in the reference examples of the present invention.

Furthermore, the inventors evaluated the physical properties of the obtained hydrochloride crystalline and found another novel type of hydrochloride crystalline form, i.e., (R)—N—((S)-1-(4-(3,3-dimethyl-2-oxoindolin-1-yl)piperidin-1-yl)-1-oxo-4-phenylbutan-2-yl)piperidine-3-carboxamide hydrochloride Crystalline Form B (hereinafter referred to as "HCl-salt Crystalline Form B").

In the obtained crystal forms, a reduction in purity (decomposition) due to influences of temperature and humidity was more suppressed in the HCl-salt Crystalline Form A and HCl-salt Crystalline Form B than that in the Free-base Amorphous of the said compound, and therefore the HCl-salt Crystalline Form A and HCl-salt Crystalline Form B were found to have very high storage stability against temperature and humidity. With regard to the storage stability against light, the HCl-salt Crystalline Form A was more stable than the Free-base Amorphous.

Moreover, as disclosed in the working examples of the present invention, this invention provides a method of preparing (R)—N—((S)-1-(4-(3,3-dimethyl-2-oxoindolin-1-yl)piperidin-1-yl)-1-oxo-4-phenylbutan-2-yl)piperidine-3-carboxamide hydrochloride Crystalline Form A (HCl-salt Crystalline Form A), including: (R)—N—((S)-1-(4-(3,3-dimethyl-2-oxoindolin-1-yl)piperidin-1-yl)-1-oxo-4-phenylbutan-2-yl)piperidine-3-carboxamide free base and hydrochloric acid in ethyl acetate are mixed to give a HCl solid. The HCl solid is dissolved in tetrahydrofuran containing water of a volume of less than 10% with heating, to which is added ethyl acetate and the mixture optionally with addition of a seed crystal is stirred with heating to afford to HCl-salt Crystalline Form A. More preferably, the HCl solid is dissolved in tetrahydrofuran containing water of a volume of 0.1 to 2.5% at 60 to 70° C., to which is added ethyl acetate and optionally with addition of a seed crystal to the mixture is stirred at 60 to 70° C. to grow HCl-salt Crystalline Form A. The Precipitates are filtered and dried to afford to HCl-salt Crystalline Form A. Those skilled in the arts have never thought of such crystallization condition.

It is an object of this invention to provide pharmaceutically suitable crystalline forms of (R)—N—((S)-1-(4-(3,3-dimethyl-2-oxoindolin-1-yl)piperidin-1-yl)-1-oxo-4-phenylbutan-2-yl)piperidine-3-carboxamide hydrochloride, which can be easily, economically and reproducibly prepared for use in a pharmaceutical formulation having consistent performance characteristics, which are unexpectedly excellent in for example filterability, ease in handling, ease in purity control, stability and non-hygroscopicity. Also it is an object of this invention to provide processes for the preparation of, compositions containing and uses of, such crystalline forms.

Solution to Problem

Thus, the invention provides:

[1] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A which is characterized by a X-ray powder diffraction (XRPD) pattern obtained by irradiation with Cu-Kalpha (Cu-Ka) radiation which includes peaks at 2-Theta 14.7, and 17.5 (°), wherein each peak has a margin of error of +/−0.2 (°);

[1-1] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A which is characterized by a X-ray powder diffraction (XRPD) pattern obtained by irradiation with Cu-Kalpha (Cu-Ka) radiation which includes peaks at 2-Theta 14.7, 17.5, and 22.3 (°), wherein each peak has a margin of error of +/−0.2 (°);

[2] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A which is characterized by a X-ray powder diffraction (XRPD) pattern obtained by irradiation with Cu-Kalpha (Cu-Ka) radiation which includes peaks at 2-Theta 4.0, 7.9, 14.7, 17.5, and 22.3 (°), wherein each peak has a margin of error of +/−0.2 (°);

[2-1] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A which is characterized by a X-ray powder diffraction (XRPD) pattern obtained by irradiation with Cu-Kalpha (Cu-Ka) radiation which includes peaks at 2-Theta 4.0, 7.9, 13.6, 14.7, 15.7, 16.7, 17.5, 22.3, 25.5, 27.1, and 31.7 (°), wherein each peak has a margin of error of +/−0.2 (°);

[3] The (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2] and [2-1], which is further characterized by differential scanning calorimetry (DSC) in which it exhibits an endothermic onset temperature of 254° C., wherein the temperature has a margin of error of +/−1° C.;

[4] The (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1] and [3], which is further characterized by an infrared (IR) spectrum (KBr) which shows absorption bands at 3327, 2926, 1707, 1668, 1616, and 700 $cm^{-1}$, wherein each peak has a margin of error of +/−2 $cm^{-1}$;

[4-1] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1] and [3], which is further characterized by an infrared (IR) spectrum (KBr) which shows absorption bands at 4047, 3971, 3327, 2926, 2758, 2712, 2621, 2523, 2490, 2401, 2120, 1952, 1898, 1707, 1668, 1616, 1460, 1385, 1358, 1306, 1250, 1223, 1119, 1061, 1051, 990, 953, 912, 745, 700, 631, 561, and 494 $cm^{-1}$, wherein each peak has a margin of error of +/−2 $cm^{-1}$; preferably absorption bands at 3327, 2926, 1707, 1668, 1616, and 700 $cm^{-1}$;

[5] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B which is characterized by a X-ray powder diffraction (XRPD) pattern obtained by irradiation with Cu-Kalpha (Cu-Ka) radiation which includes peaks at 2-Theta 19.8, and 21.6 (°), wherein each peak has a margin of error of +/−0.2 (°);

[5-1] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B which is characterized by a X-ray powder diffraction (XRPD) pattern obtained by irradiation with Cu-Kalpha (Cu-Ka) radiation which includes peaks at 2-Theta 17.9, 19.8, and 21.6 (°), wherein each peak has a margin of error of +/−0.2 (°);

[6] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B which is characterized by a X-ray powder diffraction (XRPD) pattern obtained by irradiation with Cu-Kalpha (Cu-Ka) radiation which includes peaks at 2-Theta 4.0, 7.9, 15.7, 17.9, 19.8, and 21.6 (°), wherein each peak has a margin of error of +/−0.2 (°);

[6-1] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B which is characterized by a X-ray powder diffraction (XRPD) pattern obtained by irradiation with Cu-Kalpha (Cu-Kα) radiation which includes peaks at 2-Theta 4.0, 7.9, 15.7, 17.9, 19.8, 21.6, 25.5, and 31.7 (°), wherein each peak has a margin of error of +/−0.2 (°);

[7] The (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B as described in any one of [5], [5-1], [6] and [6-1], which is further characterized by differential scanning calorimetry (DSC) in which it exhibits an endothermic onset temperature of 258° C., wherein the temperature has a margin of error of +/−1° C.;

[8] A pharmaceutical composition including (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Forms as described in any one of [1], [1-1], [2], [2-1], [3], [4], [4-1], [5], [5-1], [6], [6-1] and [7], together with one or more pharmaceutically acceptable carriers or excipients;

[9] The pharmaceutical composition as described in [8], which is a dosage form for oral, parenteral, topical, rectal, intravaginal, ocular or aural administration;

[10] The pharmaceutical composition as described in [9], wherein the dosage form is selected from the group consisting of tablets, soft capsules, hard capsules, lozenges, films, ovules, sprays, patches, suspensions, solutions, syrups, elixirs, modified release formulations, lotions, creams, ointments, gels, drops, foams, wafers, implants, microemulsions, injection, dry powder, and suppository;

[11] A pharmaceutical composition comprising a step of using (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Forms as described in any one of [1], [1-1], [2], [2-1], [3], [4], [4-1], [5], [5-1], [6], [6-1] and [7] together with one or more pharmaceutically acceptable carriers or excipients;

[12] (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Forms as described in any one of [1], [1-1], [2], [2-1], [3], [4], [4-1], [5], [5-1], [6], [6-1] and [7] for use as a medicament;

[13] A use of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Forms as described in any one of [1], [1-1], [2], [2-1], [3], [4], [4-1], [5], [5-1], [6], [6-1] and [7], or a pharmaceutical composition as described in any one of [8] to [11], in the preparation of a medicament for the curative, palliative or prophylactic treatment of disease conditions mediated by motilin receptor activity;

[14] A method of treating diseases or conditions mediated by motilin receptor activity, which comprises administering an effective amount of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Forms as described in any one of [1], [1-1], [2], [2-1], [3], [4], [4-1], [5], [5-1], [6], [6-1] and [7], or a pharmaceutical composition as described in any one of [8] to [11], to an animal, including a human, in need of such treatment;

[15] A process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1], [3], [4] and [4-1], comprising the step of adding hydrochloric acid in a first organic solvent to a solution of (R)—N—((S)-1-(4-(3,3-dimethyl-2-oxoindolin-1-yl)piperidin-1-yl)-1-oxo-4-phenylbutan-2-yl)piperidine-3-carboxamide in a second organic solvent;

preferably the first organic solvent is water, ethyl acetate, water/EtOH, dioxane, DMF, ether, acetone, ethanol, methanol, or THF;

preferably the second organic solvent is water, ethyl acetate, water/EtOH, dioxane, ethanol, methanol, ether, acetone, DMF, THF, or t-butyl methyl ether;

more preferably the first organic solvent is water, ethyl acetate, water/EtOH, dioxane, ethanol, or THF;

more preferably the second organic solvent is ethyl acetate, THF, or t-butyl methyl ether;

[16] A process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1], [3], [4] and [4-1], comprising the step of exposing (R)—N—((S)-1-(4-(3,3-dimethyl-2-oxoindolin-1-yl)piperidin-1-yl)-1-oxo-4-phenylbutan-2-yl)piperidine-3-carboxamide HCl solid in tetrahydrofuran containing water of a volume of less than 10% with heating;

[17] A process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1], [3], [4] and [4-1], comprising the step of dissolving (R)—N—((S)-1-(4-(3,3-dimethyl-2-oxoindolin-1-yl)piperidin-1-yl)-1-oxo-4-phenylbutan-2-yl)piperidine-3-carboxamide HCl solid in 0.01 to 5% (v/v) aqueous tetrahydrofuran at 50 to 80° C., and adding ethyl acetate at 50 to 80° C.;

[18] A process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1], [3], [4] and [4-1], comprising the step of heating (R)—N—((S)-1-(4-(3,3-dimethyl-2-oxoindolin-1-yl)piperidin-1-yl)-1-oxo-4-phenylbutan-2-yl)piperidine-3-carboxamide HCl solid in ethyl acetate at range 50 to 80° C., and cooling to room temperature;

[18-1] A process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1], [3], [4] and [4-1], comprising the step of heating (R)—N—((S)-1-(4-(3,3-dimethyl-2-oxoindolin-1-yl)piperidin-1-yl)-1-oxo-4-phenylbutan-2-yl)piperidine-3-carboxamide HCl solid in ethyl acetate at range 50 to 80° C., and cooling to room temperature; preferably at the range 60 to 80° C.;

[19] A process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1], [3], [4] and [4-1], comprising the step of stirring (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B in an organic solvent to convert into said HCl-salt Crystalline Form A at room temperature to 100° C.;

[20] The process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in [19], comprising the step of stirring (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B, wherein the organic solvent is ethyl acetate or THF/ethyl acetate containing water of a volume of less than 1%;

[21] A process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1], [3], [4] and [4-1], comprising the step of adding the seed of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline to a solution comprising (R)—N—((S)-1-(4-(3,3-dimethyl-2-oxoindolin-1-yl)piperidin-1-yl)-1-oxo-4-phenylbutan-2-yl)piperidine-3-carboxamide hydrochloride to obtain the HCl-salt Crystalline Form A;

[22] A process for preparing (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described in any one of [1], [1-1], [2], [2-1], [3], [4] and [4-1], which comprises the step of crystallizing the crystalline form from a solvent; preferably the solvent is water, ethyl acetate, water/EtOH, dioxane, DMF, ether, acetone, ethanol, methanol, or THF; more preferably the solvent is ethyl acetate.

Advantageous Effects of Invention

As mentioned above, it is an object of the present invention to find or prepare a crystalline or crystalline form having unexpectedly excellent physicochemical characteristics for drug development from the various viewpoints including formulation and manufacturing of the drug. It has now been surprisingly found that this object has been achieved by the present invention, which provides crystalline forms of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A.

Before the present invention, no pharmaceutically suitable crystalline form of the said compound have been identified in spite of great efforts of those skilled in the art.

The crystalline form of the present invention have an excellent and unexpected advantage over the white solid disclosed in the prior art WO2010/098145. HCl-salt Crystalline Form A is found to be more stable than the solid disclosed in the prior art WO2010/098145.

Furthermore HCl-salt Crystalline Form A of the present invention is found to be ap-plicable for a large scale synthesis. They have acceptable solid-state properties for solid-dosage form development.

BRIEF DESCRIPTION OF DRAWINGS

FIG. 1 shows the X-ray powder diffraction (XRPD) pattern of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A.

FIG. 2 shows the differential scanning calorimetry (DSC) of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A.

FIG. 3 shows the infrared (IR) spectrum of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A.

FIG. 4 shows the X-ray powder diffraction (XRPD) pattern of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B.

FIG. 5 shows the differential scanning calorimetry (DSC) of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B.

FIG. 6 shows the infrared (IR) spectrum of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B.

FIG. 7 shows the photostability of (R)—N—((S)-1-(4-(3,3-dimethyl-2-oxoindolin-1-yl)piperidin-1-yl)-1-oxo-4-phenylbutan-2-yl)piperidine-3-carboxamide amorphous solid of hydrochloride (hereinafter referred to as "HCl-salt Amorphous"). The data of the degradation products (% Area) are represented as percentage against the initial value of the initial sample of HCl-salt Amorphous.

FIG. 8 shows the photostability of (R)—N—((S)-1-(4-(3,3-dimethyl-2-oxoindolin-1-yl)piperidin-1-yl)-1-oxo-4-phenylbutan-2-yl)piperidine-3-carboxamideamorphous solid of free base (Free-base Amorphous). The data of the degradation products (% Area) are represented as percentage against the initial value of the initial sample of Free-base Amorphous.

FIG. 9 shows the photostability of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A. The data of the degradation products (% Area) are represented as percentage against the initial value of the initial sample of HCl-salt Crystalline Form A.

DESCRIPTION OF EMBODIMENTS

Accordingly, the present invention provides crystalline (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A, which is characterized by a X-ray powder diffraction (XRPD) pattern obtained by irradiation with Cu-Kα radiation which includes main peaks at 2-Theta 4.0, 7.9, 14.7, 17.5, and 22.3 (°); further in detail at 2-Theta 4.0, 7.9, 13.6, 14.7, 15.7, 16.7, 17.5, 22.3, 25.5, 27.1 and 31.7 (°); wherein each peak has a margin of error of +/−0.2 (°).

Accordingly, the present invention provides crystalline (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A as described above, which is further characterized by differential scanning calorimetry (DSC) in which it exhibits an endothermic thermal event at 254° C., wherein the temperature has a margin of error of +/−1° C.

HCl-salt Crystalline Form A as described above, which is yet further characterized by an infrared (IR) spectrum (KBr) which shows absorption bands at 3327, 2926, 1707, 1668, 1616, and 700 cm$^{-1}$; further in detail at 4047, 3971, 3327, 2926, 2758, 2712, 2621, 2523, 2490, 2401, 2120, 1952, 1898, 1707, 1668, 1616, 1460, 1385, 1358, 1306, 1250, 1223, 1119, 1061, 1051, 990, 953, 912, 745, 700, 631, 561, and 494 cm$^{-1}$, wherein each peak has a margin of error of +/−2 cm$^{-1}$.

As a further aspect of the invention, there is provided (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A of the present invention for use as a medicament.

As a yet further aspect of the invention, there is provided the use of (R)—N—((S)-1-(4-(3,3-dimethyl-2-oxoindolin- 1-yl)piperidin-1-yl)-1-oxo-4-phenylbutan-2-yl)piperidine-3-carboxamide HCl-salt Crystalline Form A of the present invention in the manufacture of a medicament for the treatment of any disease mediated by motilin receptor activity is indicated, particularly for the curative, prophylactic or palliative treatment of 1) a gastrointestinal disorder, 2) a disorder characterized by motilin receptor expressed region, and 3) a disorder in which lack of motilin secretion is involved.

The disease conditions can be selected from the group consisting of gastroesophageal reflux disorders; functional dyspepsia; irritable bowel syndrome; constipation; intestinal pseudo-obstruction; paralytic ileus following surgery or other manipulation; emesis; gastric stasis or hypomotility caused by various diseases such as diabetes and/or by the administration of other drugs, or in enterally fed patients; Crohn's disease; colitis; cachexia associated with advanced diseases such as cancer and/or the treatment thereof; appetite/metabolism related cachexia; and other disorders such as incontinence.

As an alternative aspect, there is provided a method for the treatment of any disease for which a motilin receptor activity is indicated, particularly for the curative, prophylactic or palliative treatment of gastroesophageal reflux disorders; functional dyspepsia; irritable bowel syndrome; constipation; intestinal pseudo-obstruction; paralytic ileus following surgery or other manipulation; emesis; gastric stasis or hypomotility caused by various diseases such as diabetes and/or by the administration of other drugs, or in enterally fed patients; Crohn's disease; colitis; cachexia associated with advanced diseases such as cancer and/or the treatment thereof; appetite/metabolism related cachexia; and other disorders such as incontinence, including administration of a therapeutically effective amount of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A and/or HCl-salt Crystalline Form B of the present invention to an animal, including a human, in need of such treatment.

The (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A and/or HCl-salt Crystalline Form B of the present invention is useful for the general treatment of disease conditions mediated by motilin receptor activity.

The (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A and/or HCl-salt Crystalline Form B of the present invention can also be useful for the treatment of a disorder or condition selected from the group consisting of gastroesophageal reflux disorders; functional dyspepsia; irritable bowel syndrome; constipation; intestinal pseudo-obstruction; paralytic ileus following surgery or other manipulation, emesis, gastric stasis or hypomotility caused by various diseases such as diabetes and/or by the administration of other drugs, or in enterally fed patients; Crohn's disease; colitis; cachexia associated with advanced diseases such as cancer and/or the treatment thereof; appetite/metabolism related cachexia; and other disorders such as incontinence.

Synthetic routes for the preparation of (R)—N—((S)-1-(4-(3,3-dimethyl-2-oxoindolin-1-yl)piperidin-1-yl)-1-oxo-4-phenylbutan-2-yl)piperidine-3-carboxamide are described in WO2010/098145 and in Example Section below.

The (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A can be prepared by crystallization from a solution of (R)—N—((S)-1-(4-(3,3-dimethyl-2-oxoindolin-1-yl)piperidin-1-yl)-1-oxo-4-phenylbutan-2-yl)piperidine-3-carboxamide in an organic solvent such as ethyl acetate by adding an ethers such as diethyl ether and MTBE (t-butyl methyl ether) of HCl.

Organic solvents including carboxylic ester such as ethyl acetate and tetrahydrofuran can be used for the crystallization of HCl-salt Crystalline Form A. Preferably examples of solvents which can be mixed with ethyl acetate include one or more than one solvents selected from: water; alcohols such as methanol, ethanol, and propanol; ethers such as diethyl ether, tert-butylmethyl ether, dioxane, and tetrahydrofuran; hydrocarbons such as hexane, heptane, cyclohexane, dichloromethane, chloroform, benzene, toluene, and xylene; ketones such as acetone and methylethylketone; amides such as dimethylformamide and dimethylacetamide; and sulfoxides such as dimethyl-sulfoxide.

The (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A and/or HCl-salt Crystalline Form B of the present invention can be administered alone or in combination with one or more other drugs (or as any combination thereof). Generally, they will be administered as a formulation in association with one or more pharmaceutically acceptable excipients. The term 'excipient' is used herein to describe any ingredient other than the compound of the invention. The choice of excipient will to a large extent depend on factors such as the particular mode of administration, the effect of the excipient on solubility and stability, and the nature of the dosage form.

Thus, as a further aspect of the present invention, there is provided a pharmaceutical composition including (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Forms and one or more suitable excipients. The composition is suitable for the treatment of disease conditions mediated by motilin receptor activity.

The term "HCl-salt Crystalline Forms", as used herein, includes HCl-salt Crystalline Form A and/or HCl-salt Crystalline Form B.

Weight purity of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A of the present invention is not limited, but preferably an essentially pure crystalline forms can be used for specific embodiments in this invention.

For the avoidance of doubt, the expression 'essentially pure' when used herein means at least 90% by weight purity. More preferably, 'essentially pure' means at least 95% by weight purity and most preferably means at least 98% by weight purity.

References herein to "treatment" include references to curative, palliative and prophylactic treatment.

As used herein, the article "a" or "an" refers to both the singular and plural form of the object to which it refers unless indicated otherwise.

The term "animal," as used herein, includes a mammalian subject or a non-mammalian subject. Examples of suitable mammalian subject may include, without limit, human, rodents, companion animals, livestock, and primates. Suitable rodents may include, but are not limited to, mice, rats, hamsters, gerbils, and guinea pigs. Suitable companion animals may include, but are not limited to, cats, dogs, rabbits, and ferrets. Suitable livestock may include, but are not limited to, horses, goats, sheep, swine, cattle, llamas, and alpacas. Suitable primates may include, but are not limited to, chimpanzees, lemurs, macaques, marmosets, spider monkeys, squirrel monkeys, and vervet monkeys. Examples of suitable non-mammalian subject may include, without limit, birds, reptiles, amphibians, and fish. Non-limiting examples of birds include chickens, turkeys, ducks, and geese. The preferred mammalian subject is a human.

For non-human animal administration, the term 'pharmaceutical' as used herein may be replaced by 'veterinary'.

Pharmaceutical compositions suitable for the delivery of HCl-salt Crystalline Forms of the invention and methods for the preparation will be readily apparent to those skilled in the art. Such compositions and methods for the preparation may be found, for example, in Remington's Pharmaceutical Sciences, 19th Edition (Mack Publishing Company, 1995); Polymorphism: In the Pharmaceutical Industry by Rolf Hilfiker (John Wiley & Sons, 2006).

Oral Administration

HCl-salt Crystalline Forms of the invention may be administered orally. Oral administration may involve swallowing, so that the compound enters the gastrointestinal tract, and/or buccal, lingual, or sublingual administration by which the compound enters the blood stream directly from the mouth.

Formulations suitable for oral administration include solid, semi-solid and liquid systems such as tablets; soft or hard capsules containing multi- or nano-particulates, liquids, or powders; lozenges (including liquid-filled); chews; gels; fast dispersing dosage forms; films; ovules; sprays; and buccal or mucoadhesive patches.

Liquid formulations include suspensions, solutions, syrups and elixirs. Such formulations may be employed as fillers in soft or hard capsules (made, for example, from gelatin or hydroxypropylmethylcellulose) and typically comprise a carrier, for example, water, ethanol, polyethylene glycol, propylene glycol, methylcellulose, or a suitable oil, and one or more emulsifying agents and/or suspending agents. Liquid formulations may also be prepared by the reconstitution of a solid, for example, from a sachet.

HCl-salt Crystalline Forms of the invention may also be used in fast-dissolving, fast-disintegrating dosage forms such as those described in Expert Opinion in Therapeutic Patents, 11 (6), 981-986, by Liang and Chen (2001).

For tablet dosage forms, depending on dose, the drug may make up from 1 weight % to 80 weight % of the dosage form, more typically from 5 weight % to 60 weight % of the dosage form. In addition to the drug, tablets generally contain a disintegrant. Examples of disintegrants include sodium starch glycolate, sodium carboxymethyl cellulose, calcium carboxymethyl cellulose, croscarmellose sodium, crospovidone, polyvinylpyrrolidone, methyl cellulose, microcrystalline cellulose, lower alkyl-substituted hydroxypropyl cellulose, starch, pregelatinized starch and sodium alginate. Generally, the disintegrant will comprise from 1 weight % to 25 weight %, preferably from 5 weight % to 20 weight % of the dosage form.

Binders are generally used to impart cohesive qualities to a tablet formulation. Suitable binders include microcrystalline cellulose, gelatin, sugars, polyethylene glycol, natural and synthetic gums, polyvinylpyrrolidone, pregelatinised starch, hydroxypropyl cellulose and hydroxypropyl methylcellulose. Tablets may also contain diluents, such as lactose (monohydrate, spray-dried monohydrate, anhydrous, etc.), mannitol, xylitol, dextrose, sucrose, sorbitol, microcrystalline cellulose, starch and dibasic calcium phosphate dihydrate.

Tablets may also optionally comprise surface active agents, such as sodium lauryl sulfate and polysorbate 80, and glidants such as silicon dioxide and talc. When present, surface active agents may be contained from 0.2 weight % to 5 weight % of the tablet, and glidants may be contained from 0.2 weight % to 1 weight % of the tablet.

Tablets also generally contain lubricants such as magnesium stearate, calcium stearate, zinc stearate, sodium stearyl fumarate, and mixtures of magnesium stearate with sodium lauryl sulphate. Lubricants generally comprise from 0.25 weight % to 10 weight %, preferably from 0.5 weight % to 3 weight % of the tablet.

Other possible ingredients include anti-oxidants, colourants, flavouring agents, preservatives and taste-masking agents.

Exemplary tablets contain up to about 80% drug, from about 10 weight % to about 90 weight % binder, from about 0 weight % to about 85 weight % diluent, from about 2 weight % to about 10 weight % disintegrant, and from about 0.25 weight % to about 10 weight % lubricant.

Tablet blends may be compressed directly or by roller to form tablets. Tablet blends or portions of blends may alternatively be wet-, dry-, or melt-granulated, melt congealed, or extruded before tabletting. The final formulation may comprise one or more layers and may be coated or uncoated; it may even be encapsulated.

The formulation of tablets is discussed in Pharmaceutical Dosage Forms: Tablets, Vol. 1, by H. Lieberman and L. Lachman (Marcel Dekker, New York, 1989); Pharmaceutical Dosage Forms: Tablets, Third Edition, Vol. 2: Rational Design and Formulation, by Larry L. Augsburger and Hoag W. Stephen (Informa Healthcare, Published June 2008).

Consumable oral films for human or veterinary use are typically pliable water-soluble or water-swellable thin film dosage forms which may be rapidly dissolving or mucoadhesive and typically comprise a HCl-salt Crystalline Forms in accordance with the invention, a film-forming polymer, a binder, a solvent, a humectant, a plasticizer, a stabilizer or emulsifier, a viscosity-modifying agent and a solvent. Some components of the formulation may perform more than one function.

Formulation of HCl-salt Crystalline Forms of the invention may be water-soluble or insoluble depending on circumstance conditions. A water-soluble compound typically may comprise from 1 weight % to 80 weight %, more typically from 20 weight % to 50 weight %, of the solutes. Less soluble compounds may comprise in a greater proportion of the composition, typically up to 88 weight % of the solutes. Alternatively, HCl-salt Crystalline Forms of the invention may be in the form of multiparticulate beads.

The film-forming polymer may be selected from natural polysaccharides, proteins, or synthetic hydrocolloids and is typically present in the range of 0.01 to 99 weight %, more typically in the range of 30 to 80 weight %.

Other possible ingredients include anti-oxidants, colorants, flavourings and flavour enhancers, preservatives, salivary stimulating agents, cooling agents, co-solvents (including oils), emollients, bulking agents, anti-foaming agents, surfactants and taste-masking agents.

Films in accordance with the invention are typically prepared by evaporative drying of thin aqueous films coated onto a peelable backing support or paper.

This may be done in a drying oven or tunnel, typically a combined coater dryer, or by freeze-drying or vacuuming.

Solid formulations for oral administration may be formulated to be immediate and/or modified release. Modified release formulations include delayed-, sustained-, pulsed-, controlled-, targeted- and programmed-release.

Suitable modified release formulations for the purposes of the invention are described in U.S. Pat. No. 6,106,864.

Details of other suitable release technologies such as high energy dispersions, osmotic and coated particles are to be found in Pharmaceutical Technology On-line, 25(2), 1-14, by Verma et al (2001). The use of chewing gum to achieve controlled release is described in WO 00/35298.

Parenteral Administration

The HCl-salt Crystalline Forms of the invention may also be administered directly into the blood stream, into muscle, or into an internal organ. Suitable means for parenteral administration include intravenous, intraarterial, intraperitoneal, intrathecal, intraventricular, intraurethral, intrastemal, intracranial, intramuscular, intrasynovial and subcutaneous. Suitable devices for parenteral administration include needle (including microneedle) injectors, needle-free injectors and infusion techniques.

Parenteral formulations are typically aqueous solutions which may contain excipients such as salts, carbohydrates and buffering agents (preferably to a pH of from 3 to 9), but, for some applications, they may be more suitably formulated as a sterile non-aqueous solution or as a dried form to be used in conjunction with a suitable vehicle such as sterile, pyrogen-free water.

The preparation of parenteral formulations under sterile conditions, for example, by lyophilization, may readily be accomplished using standard pharmaceutical techniques well known to those skilled in the art.

Formulations for parenteral administration may be formulated to be immediate and/or modified release. Modified release formulations include delayed-, sustained-, pulsed-, controlled-, targeted- and programmed-release. Thus the HCl-salt Crystalline Forms of the invention may be formulated as a suspension or as a solid, semi-solid, or thixotropic liquid for administration as an implanted depot providing modified release of the active compound. Examples of such formulations include drug-coated stents and semi-solids and suspensions comprising drug-loaded poly(lactic-co-glycolic acid) (PLGA) microspheres.

Topical Administration

The HCl-salt Crystalline Forms of the invention may also be administered topically, (intra)dermally, or transdermally to the skin or mucosa. Typical formulations for this purpose include gels, hydrogels, lotions, solutions, creams, ointments, dusting powders, dressings, foams, films, skin patches, wafers, implants, sponges, fibers, bandages and microemulsions. Liposomes may also be used. Typical carriers include alcohol, water, mineral oil, liquid petrolatum, white petrolatum, glycerin, polyethylene glycol and propylene glycol. Penetration enhancers may be incorporated—see, for example, J Pharm Sci, 88 (10), 955-958, by Finnin and Morgan (October 1999).

Other means of topical administration include delivery by electroporation, iontophoresis, phonophoresis, sonophoresis, and microneedle or needle-free (e.g. Powderject (trademark), Bioject (trademark), etc.) injection. Topical administration may also be achieved using a patch, such as a transdermal iontophoretic patch.

Formulations for topical administration may be formulated to be immediate and/or modified release. Modified release formulations include delayed-, sustained-, pulsed-, controlled-, targeted- and programmed-release.

The HCl-salt Crystalline Forms of the invention can also be administered intranasally or by inhalation, typically in the form of a dry powder (either alone, as a mixture, for example, in a dry blend with lactose, or as a mixed component particle, for example, mixed with phospholipids, such as phosphatidylcholine) from a dry powder inhaler, as an aerosol spray from a pressurized container, pump, spray, atomizer (preferably an atomizer using electrohydrodynamics to produce a fine mist), or nebulizer, with or without the use of a suitable propellant, such as 1,1,1,2-tetrafluoroethane or 1,1,1,2,3,3,3-heptafluoropropane, or as nasal drops. For intranasal use, the powder may comprise a bioadhesive agent, for example, chitosan or cyclodextrin.

The pressurized container, pump, spray, atomizer, or nebulizer contains a solution or suspension of HCl-salt Crystalline Forms in accordance with the invention comprising, for example, ethanol, aqueous ethanol, or a suitable alternative agent for dispersing, solubilizing, or extending release of the active, a propellant(s) as solvent and an optional surfactant, such as sorbitan trioleate, oleic acid, or an oligolactic acid.

Prior to use in a dry powder or suspension formulation, the drug product is micronized to a size suitable for delivery by inhalation (typically less than 5 microns). This may be achieved by any appropriate comminuting method, such as spiral jet milling, fluid bed jet milling, supercritical fluid processing to form nanoparticles, high pressure homogenization, or spray drying.

Capsules (made, for example, from gelatin or hydroxypropylmethylcellulose), blisters and cartridges for use in an inhaler or insufflator may be formulated to contain a powder mix of the compound of the invention, a suitable powder base such as lactose or starch and a performance modifier such as L-leucine, mannitol, or magnesium stearate. The lactose may be anhydrous or in the form of the monohydrate, preferably the latter. Other suitable excipients include dextran, glucose, maltose, sorbitol, xylitol, fructose, sucrose and trehalose.

A suitable solution formulation for use in an atomizer using electrohydrodynamics to produce a fine mist may contain from 1 microg to 20 mg of the compound of the invention per actuation and the actuation volume may vary from 1 microL to 100 microL. A typical formulation may comprise HCl-salt Crystalline Forms in accordance with the invention, propylene glycol, sterile water, ethanol and sodium chloride. Alternative solvents which may be used instead of propylene glycol include glycerol and polyethylene glycol.

Suitable flavours, such as menthol and levomenthol, or sweeteners, such as saccharin or saccharin sodium, may be added to those formulations of the invention intended for inhaled/intranasal administration.

Formulations for inhaled/intranasal administration may be formulated to be immediate and/or modified release using, for example, PLGA. Modified release formulations include delayed-, sustained-, pulsed-, controlled-, targeted- and programmed-release.

In the case of dry powder inhalers and aerosols, the dosage unit is determined by means of a valve which delivers a metered amount. Units in accordance with the invention are typically arranged to administer a metered dose or "puff" containing from 1 microg to 20 mg of (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Forms. The overall daily dose will typically be in the range of 1 microg to 100 mg which may be administered in a single dose or, more usually, as divided doses throughout the day.

Rectal/Intravaginal Administration

HCl-salt Crystalline Forms of the invention may be administered rectally or vaginally, for example, in the form of a suppository, pessary, or enema. Cocoa butter is a traditional suppository base, but various alternatives may be used as appropriate.

Formulations for rectal/intravaginal administration may be formulated to be immediate and/or modified release. Modified release formulations include delayed-, sustained-, pulsed-, controlled-, targeted- and programmed-release.

Ocular/Aural Administration

HCl-salt Crystalline Forms of the invention may also be administered directly to the eye or ear, typically in the form of drops of a micronized suspension or solution in isotonic, pH-adjusted, sterile saline. Other formulations suitable for ocular and aural administration include ointments, gels, biodegradable (e.g. absorbable gel sponges, collagen) and non-biodegradable (e.g. silicone) implants, wafers, lenses and particulate or vesicular systems, such as niosomes or liposomes. A polymer such as crossed-linked polyacrylic acid, polyvinylalcohol, hyaluronic acid, a cellulosic polymer, for example, hydroxypropylmethylcellulose, hydroxyethylcellulose, or methyl cellulose, or a heteropolysaccharide polymer, for example, gellan gum, may be incorporated together with a preservative, such as benzalkonium chloride. Such formulations may also be delivered by iontophoresis.

Formulations for ocular/aural administration may be formulated to be immediate and/or modified release. Modified release formulations include delayed-, sustained-, pulsed-, controlled-, targeted-, or programmed-release.

Other Technologies

HCl-salt Crystalline Forms of the invention may be combined with soluble macro-molecular entities, such as cyclodextrin and suitable derivatives thereof or polyethylene glycol-containing polymers, in order to improve their solubility, dissolution rate, taste-masking, bioavailability and/or stability for use in any of the afore-mentioned modes of administration.

Drug-cyclodextrin complexes, for example, are found to be generally useful for most dosage forms and administration routes. Both inclusion and non-inclusion complexes may be used. As an alternative to direct complexation with the drug, the cyclodextrin may be used as an auxiliary additive, i.e. as a carrier, diluent, or solubilizer. Most commonly used for these purposes are alpha-, beta- and gamma-cyclodextrins, examples of which may be found in International Patent Applications Nos. WO 91/11172, WO 94/02518, WO 98/55148 and Evrard, B., et al., Journal of Controlled Release 96 (3), pp. 403-410, 2004.

Dosage

For treating or preventing the disease conditions mediated by motilin receptor activity, a suitable dosage level of HCl-salt Crystalline Forms of this invention is about 0.0001 to 1000 mg per day, preferably about 0.001 to 100 mg per day, and more preferably about 0.005 to 50 mg per day, and most preferably 1 to 50 mg per day of the active compound. The compounds may be administered on a regimen of 1 to 4 times per day. In some cases, however, a dosage outside these limits may be used.

These dosages are based on an average human subject having a weight of about 60 kg to 70 kg. The physician will readily be able to determine doses for subjects whose weight falls outside this range, such as infants and the elderly. For the avoidance of doubt, references herein to "treatment" include references to curative, palliative and prophylactic treatment.

HCl-salt Crystalline Forms of the present invention may also optionally be combined with another pharmacologically active compound, or with two or more other pharmacologically active compounds, particularly for the treatment of disease conditions mediated by motilin receptor activity. For example, the HCl-salt Crystalline Forms of the present invention, as defined above, may be administered simultaneously, sequentially or separately in combination with one or more agents selected from;

- an opioid analgesic, e.g. morphine, heroin, hydromorphone, oxymorphone, levorphanol, levallorphan, methadone, meperidine, fentanyl, cocaine, codeine, dihydrocodeine, oxycodone, hydrocodone, propoxyphene, nalmefene, nalorphine, naloxone, naltrexone, buprenorphine, butorphanol, nalbuphine or pentazocine;
- a nonsteroidal antiinflammatory drug (NSAID), e.g. aspirin, diclofenac, diflusinal, etodolac, fenbufen, fenoprofen, flufenisal, flurbiprofen, ibuprofen, indomethacin, ketoprofen, ketorolac, meclofenamic acid, mefenamic acid, meloxicam, nabumetone, naproxen, nimesulide, nitroflurbiprofen, olsalazine, oxaprozin, phenylbutazone, piroxicam, sulfasalazine, sulindac, tolmetin or zomepirac;
- a barbiturate sedative, e.g. amobarbital, aprobarbital, butabarbital, butabital, mephobarbital, metharbital, methohexital, pentobarbital, phenobartital, secobarbital, talbutal, theamylal or thiopental;
- a benzodiazepine having a sedative action, e.g. chlordiazepoxide, clorazepate, diazepam, flurazepam, lorazepam, oxazepam, temazepam or triazolam;
- an H1 antagonist having a sedative action, e.g. diphenhydramine, pyrilamine, promethazine, chlorpheniramine or chlorcyclizine;
- a sedative such as glutethimide, meprobamate, methaqualone or dichloralphenazone;
- a skeletal muscle relaxant, e.g. baclofen, carisoprodol, chlorzoxazone, cyclobenzaprine, methocarbamol or orphrenadine;
- an NMDA receptor antagonist, e.g. dextromethorphan ((+)-3-hydroxy-N-methylmorphinan) or its metabolite dextrorphan ((+)-3-hydroxy-N-methylmorphinan), ketamine, memantine, pyrroloquinoline quinine, cis-4-(phosphonomethyl)-2-piperidinecarboxylic acid, budipine, EN-3231 (MorphiDex®, a combination formulation of morphine and dextromethorphan), topiramate, neramexane or perzinfotel including an NR2B antagonist, e.g. ifenprodil, traxoprodil or (−)-(R)-6-{2-[4-(3-fluorophenyl)-4-hydroxy-1-piperidinyl]-1-hydroxyethyl-3,4-dihydro-2(1H)-quinolinone;
- an alpha-adrenergic, e.g. doxazosin, tamsulosin, clonidine, guanfacine, dexmedetomidine, modafinil, or 4-amino-6,7-dimethoxy-2-(5-methane-sulfonamido-1, 2,3,4-tetrahydroisoquinol-2-yl)-5-(2-pyridyl) quinazoline;
- a tricyclic antidepressant, e.g. desipramine, imipramine, amitriptyline or nortriptyline;
- an anticonvulsant, e.g. carbamazepine, lamotrigine, topiratmate or valproate;
- a tachykinin (NK) antagonist, particularly an NK-3, NK-2 or NK-1 antagonist, e.g. (alphaR,9R)-7-[3,5-bis(trifluoromethyl)benzyl]-8,9,10,11-tetrahydro-9-methyl-5-(4-methylphenyl)-7H-[1,4]diazocino[2,1-g][1,7]-naphthyridine-6,13-dione (TAK-637), 5-[[(2R,3S)-2-[(1R)-1-[3,5-bis(trifluoromethyl)phenyl]ethoxy-3-(4-fluorophenyl)-4-morpholinyl]-methyl]-1,2-dihydro-3H-1,2,4-triazol-3-one (MK-869), aprepitant, lanepitant, dapitant or 3-[[2-methoxy-5-(trifluoromethoxy)phenyl]-methylamino]-2-phenylpiperidine (2S,3S);
- a muscarinic antagonist, e.g. oxybutynin, tolterodine, propiverine, trospium chloride, darifenacin, solifenacin, temiverine and ipratropium;

a COX-2 selective inhibitor, e.g. celecoxib, rofecoxib, parecoxib, valdecoxib, deracoxib, etoricoxib, or lumiracoxib;

a coal-tar analgesic, in particular paracetamol;

a neuroleptic such as droperidol, chlorpromazine, haloperidol, perphenazine, thioridazine, mesoridazine, trifluoperazine, fluphenazine, clozapine, olanzapine, risperidone, ziprasidone, quetiapine, sertindole, aripiprazole, sonepiprazole, blonanserin, iloperidone, perospirone, raclopride, zotepine, bifeprunox, asenapine, lurasidone, amisulpride, balaperidone, palindore, eplivanserin, osanetant, rimonabant, meclinertant, Miraxion® or sarizotan;

a vanilloid receptor agonist (e.g. resiniferatoxin) or antagonist (e.g. capsazepine);

a transient receptor potential cation channel subtype (V1, V2, V3, V4, M8, A1) agonist or antagonist;

a beta-adrenergic such as propranolol;

a local anaesthetic such as mexiletine;

a corticosteroid such as dexamethasone;

a 5-HT receptor agonist or antagonist, particularly a 5-HT1B/1D agonist such as eletriptan, sumatriptan, naratriptan, zolmitriptan or rizatriptan;

a 5-HT2A receptor antagonist such as R(+)-alpha-(2,3-dimethoxy-phenyl)-1-[2-(4-fluorophenylethyl)]-4-piperidinemethanol (MDL-100907);

a cholinergic (nicotinic) analgesic, such as ispronicline (TC-1734), (E)-N-methyl-4-(3-pyridinyl)-3-buten-1-amine (RJR-2403), (R)-5-(2-azetidinylmethoxy)-2-chloropyridine (ABT-594) or nicotine;

Tramadol®;

a PDEV inhibitor, such as

5-[2-ethoxy-5-(4-methyl-1-piperazinyl-sulphonyl)phenyl]-1-methyl-3-n-propyl-1,6-dihydro-7H-pyrazolo[4,3-d]pyrimidin-7-one (sildenafil), (6R,12aR)-2,3,6,7,12,12a-hexahydro-2-methyl-6-(3,4-methylenedioxyphenyl)-pyrazino[2',1':6,1]-pyrido[3,4-b]indole-1,4-dione (IC-351 or tadalafil), 2-[2-ethoxy-5-(4-ethyl-piperazin-1-yl-1-sulphonyl)-phenyl]-5-methyl-7-propyl-3H-imidazo[5,1-f][1,2,4]triazin-4-one (vardenafil), 5-(5-acetyl-2-butoxy-3-pyridinyl)-3-ethyl-2-(1-ethyl-3-azetidinyl)-2,6-dihydro-7H-pyrazolo[4,3-d]pyrimidin-7-one, 5-(5-acetyl-2-propoxy-3-pyridinyl)-3-ethyl-2-(1-isopropyl-3-azetidinyl)-2,6-dihydro-7H-pyrazolo[4,3-d]pyrimidin-7-one, 5-[2-ethoxy-5-(4-ethylpiperazin-1-ylsulphonyl)pyridin-3-yl]-3-ethyl-2-[2-methoxyethy-1]-2,6-dihydro-7H-pyrazolo[4,3-d]pyrimidin-7-one, 4-[(3-chloro-4-methoxybenzyl)amino]-2-[(2S)-2-(hydroxymethyl)pyrrolidin-1-yl]-N-(pyrimidin-2-ylmethyl) pyrimidine-5-carboxamide, 3-(1-methyl-7-oxo-3-propyl-6,7-dihydro-1H-pyrazolo[4,3-d]pyrimidin-5-yl)-N-[2-(1-methylpyrrolidin-2-yl)ethyl]-4-propoxybenzenesulfonamide;

an alpha-2-delta ligand such as gabapentin, pregabalin, 3-methylgabapentin, (1alpha,3 alpha,5alpha)(3-aminomethyl-bicyclo[3.2.0]hept-3-yl)-acetic acid, (3S,5R)-3 aminomethyl-5 methyl-heptanoic acid, (3S,5R)-3 amino-5 methyl-heptanoic acid, (3S,5R)-3 amino-5 methyl-octanoic acid, (2S,4S)-4-(3-chlorophenoxy) proline, (2S,4S)-4-(3-fluorobenzyl)-proline, [(1R,5R,6S)-6-(aminomethyl)bicyclo[3.2.0]hept-6-yl]acetic acid, 3-(1-aminomethyl-cyclohexylmethyl)-4H-[1,2,4] oxadiazol-5-one, C-[1-(1H-tetrazol-5-ylmethyl)-cycloheptyl]-methylamine, (3S,4S)-(1-aminomethyl-3,4-dimethyl-cyclopentyl)-acetic acid, (3S,5R)-3 aminomethyl-5 methyl-octanoic acid, (3S,5R)-3 amino-5 methyl-nonanoic acid, (3S,5R)-3 amino-5 methyl-octanoic acid, (3R,4R,5R)-3-amino-4,5-dimethyl-heptanoic acid and (3R,4R,5R)-3-amino-4,5-dimethyl-octanoic acid;

a cannabinoid;

a metabotropic glutamate subtype 1 receptor (mGluR1) antagonist;

a serotonin reuptake inhibitor such as sertraline, sertraline metabolite demethylsertraline, fluoxetine, norfluoxetine (fluoxetine desmethyl metabolite), fluvoxamine, paroxetine, citalopram, citalopram metabolite desmethylcitalopram, escitalopram, d,l-fenfluramine, femoxetine, ifoxetine, cyanodothiepin, litoxetine, dapoxetine, nefazodone, cericlamine and trazodone;

a noradrenaline (norepinephrine) reuptake inhibitor, such as maprotiline, lofepramine, mirtazapine, oxaprotiline, fezolamine, tomoxetine, mianserin, buproprion, buproprion metabolite hydroxybuproprion, nomifensine and viloxazine (Vivalan®), especially a selective noradrenaline reuptake inhibitor such as reboxetine, in particular (S,S)-reboxetine;

a dual serotonin-noradrenaline reuptake inhibitor, such as venlafaxine, venlafaxine metabolite O-desmethylvenlafaxine, clomipramine, clomipramine metabolite desmethylclomipramine, duloxetine, milnacipran and imipramine;

an inducible nitric oxide synthase (iNOS) inhibitor such as S-[2-[(1-iminoethyl)amino]ethyl]-L-homocysteine, S-[2-[(1-iminoethyl)-amino]ethyl]-4,4-dioxo-L-cysteine, S-[2-[(1-iminoethyl)amino]ethyl]-2-methyl-L-cysteine, (2S,5Z)-2-amino-2-methyl-7-[(1-iminoethyl)amino]-5-heptenoic acid, 2-[[(1R,3S)-3-amino-4-hydroxy-1-(5-thiazolyl)-butyl]thio]-5-chloro-3-pyridinecarbonitrile; 2-[[(1R,3S)-3-amino-4-hydroxy-1-(5-thiazolyl)butyl]thio]-4-chlorobenzonitrile, (2S,4R)-2-amino-4-[[2-chloro-5-(trifluoromethyl)phenyl] thio]-5-thiazolebutanol, 2-[[(1R,3S)-3-amino-4-hydroxy-1-(5-thiazolyl)butyl]thio]-6-(trifluoromethyl)-3 pyridinecarbonitrile, 2-[[(1R,3S)-3-amino-4-hydroxy-1-(5-thiazolyl)butyl]thio]-5-chlorobenzonitrile, N-[4-[2-(3-chlorobenzylamino) ethyl]phenyl]thiophene-2-carboxamidine, or guanidinoethyldisulfide;

an acetylcholinesterase inhibitor such as donepezil;

a prostaglandin E2 subtype 4 (EP4) antagonist such as N-[({2-[4-(2-ethyl-4,6-dimethyl-1H-imidazo[4,5-c] pyridin-1-yl)phenyl]ethyl} amino)-car bonyl]-4-methylbenzenesulfonamide or 4-[(1S)-1-({[5-chloro-2-(3-fluorophenoxy)pyridin-3-yl]carbonyl}amino)ethyl] benzoic acid;

a leukotriene B4 antagonist; such as 1-(3-biphenyl-4-ylmethyl-4-hydroxy-chroman-7-yl)-cyclopentanecarboxylic acid (CP-105696), 5-[2-(2-Carboxyethyl)-3-[6-(4-methoxyphenyl)-5E-hexenyl]oxyphenoxy]-valeric acid (ONO-4057) or DPC-11870, a 5-lipoxygenase inhibitor, such as zileuton, 6-[(3-fluoro-5-[4-methoxy-3,4,5,6-tetrahydro-2H-pyran-4-yl])phenoxy-methyl]-1-meth yl-2-quinolone (ZD-2138), or 2,3,5-trimethyl-6-(3-pyridylmethyl),1,4-benzoquinone (CV-6504);

a sodium channel blocker, such as lidocaine;

a calcium channel blocker, such as ziconotide, zonisamide, mibefradil;

a 5-HT3 antagonist, such as ondansetron;

a chemotherapy drug such as oxaliplatin, 5-fluorouracil, leukovolin, paclitaxel;
a calcitonin gene related peptide (CGRP) antagonist;
a bradykinin (BK1 and BK2) antagonist;
a voltage gated sodium dependent channel blocker ($Na_{v1.3}$, $Na_{v1.7}$, $Na_{v1.8}$);
a voltage dependent calcium channel blocker (N-type, T-type);
a P2X (ion channel type ATP receptor) antagonist;
an acid-sensing ion channel (ASIC1a, ASIC3) antagonist;
an Angiotensin AT2 antagonist;
a Chemokine CCR2B receptor antagonist;
a Cathepsin (B, S, K) inhibitor;
a signal receptor agonist or antagonist;
and the pharmaceutically acceptable salts and solvates thereof.

Such combinations offer significant advantages, including synergistic activity, in therapy.

Combination Drug and Kit

One embodiment of the present invention is a combination of HCl-salt Crystalline Forms of the present invention, and a drug for diseases, which is different from HCl-salt Crystalline Forms of the present invention. A "combination" according to the invention may be present as a "fix combination" or as a "kit of parts combination". A "fix combination" is defined as a combination wherein the (i) at least one drug for diseases, which is different from HCl-salt Crystalline Forms of the present invention, and (ii) HCl-salt Crystalline Forms are present in one unit. A "kit of parts combination" is defined as a combination wherein the (i) at least one drug for diseases, which is different from HCl-salt Crystalline Forms of the present invention, and (ii) HCl-salt Crystalline Forms are present in more than one unit. The components of the "kit of parts combination" may be administered simultaneously, sequentially or separately. The molar ratio of the drug, which is different from HCl-salt Crystalline Forms of the present invention, to HCl-salt Crystalline Forms used according to the invention is within the range of from 1:100 to 100:1, such as from 1:50 to 50:1 or from 1:20 to 20:1 or from 1:10 to 10:1. The two drugs may be administered separately in the same ratio.

The present invention extends to a combination comprising (R)—N—((S)-1-(4-(3,3-dimethyl-2-oxoindolin-1-yl)piperidin-1-yl)-1-oxo-4-phenylbuta n-2-yl)piperidine-3-carboxamide HCl-salt Crystalline Forms and one or more therapeutic agents, such as those listed above, for simultaneous, separate or sequential use in the curative, prophylactic or palliative treatment of disease conditions mediated by motilin receptor activity.

EXAMPLES

Hereinafter, the present invention will be illustrated in detail by Examples, but the technical scope of the present invention is not limited thereto. Various modifications can be made within the technical idea of the present invention by those with ordinary skill in the art. The following example is for reference only.

Analysis

X-Ray Powder Diffraction (XRPD)

The XRPD analyses are performed using a Rigaku RINT-TTR or Rigaku MiniFlex600 X-ray powder diffractometer using Cu-Ka radiation. The samples can also be measured under the high/low temperature condition by using the attachment of the variant-temperature sample holder. The instrument is equipped with a fine focus X-ray tube. The tube voltage and amperage are set to 50 kV and 300 mA (RINT-TTR) or 40 kV and 15 mA (MiniFlex600). The divergence slit, scattering slit and receiving slit are set at 0.5°, 0.5° and 0.15 mm (RINT-TTR) or 1.25°, 13.0 mm (Open) and 13.0 mm (Open) (MiniFlex600), respectively. Diffracted radiation is detected by a NaI scintillation detector (RINT-TTR) or D/teX Ultra (MiniFlex600). A theta-two theta continuous scan at 4°/min (RINT-TTR) or 20°/min (MiniFlex600) from 3 to 40 (°) 2-theta is used. A silicon standard is analyzed to check the machine alignment. Data are collected and analyzed using-Rigaku X-ray system. Samples are prepared for analysis by placing them in an aluminum sample holder that is rotated during data acquisition.

Thermogravimetry/Differential Thermal Analysis (TG/DTA)

TG/DTA is performed using Seiko 6200R system. The sample is placed into an aluminum TG/DTA pan. Each sample is heated under a nitrogen purge at a rate of 5° C./min, up to a final temperature of 300° C. Indium metal is used as the calibration standard. Reported values are rounded and should therefore be considered approximate.

Differential Scanning Calorimetry (DSC)

DSC analysis is performed using Mettler Toledo DSC822. The sample is placed into an aluminum DSC pan and the weight accurately recorded. The pan is covered with a lid with a pinhole and then crimped. Each sample is heated under a nitrogen purge at a rate of 5° C./min, up to a final temperature of 280° C. Indium metal is used as the calibration standard. Reported values are rounded and should therefore be considered approximate.

FT-IR Spectroscopy

Infrared spectra are acquired on a Shimadzu IRPrestage-21 (FT-IR) spec-trophotometer equipped with an air cooled high energy ceramic light source, a Germanium-coated potassium bromide (KBr) plate for middle IR beamsplitter, and a high sensitivity pyroelectric detector (DLATGS). Diffuse reflection method equipped with DRS-8000 diffuse reflectance accessory is used for measurements. Sample powder is mixed with a small quantity of KBr powder on sample plate, 6 mm in diameter and 1.5 mm in depth. Each spectrum represents 40 co-added scans collected at a spectral resolution of 4 $cm^{-1}$. A background data set is acquired with a filling of KBr powder. Wavelength calibration is performed using polystyrene. Reported values are rounded and should therefore be considered approximate.

Hygroscopicity Study by Dynamic Vapor Sorption Analysis (DVS)

Hygroscopicity study is performed using Surface Measurement Systems DVS-1. The sample is placed on a microbalance in the instrument and the weight change during the sorption at 25° C. is monitored. One of the programs consists of a sorption scan from 0 to 90% relative humidity (RH) at 5% RH increments and the sample is allowed to equilibrate for 360 minutes or until equilibration had been attained at each step.

Nuclear Magnetic Resonance (NMR)

NMR data are determined at 270 MHz (JEOL JNM-LA 270 spectrometer) or 300 MHz (JEOL JNM-LA300) using deuterated chloroform (99.8% D) or dimethyl-sulfoxide (99.9% D) as solvent unless indicated otherwise, relative to tetramethylsilane (TMS) as internal standard in parts per million (ppm); conventional abbreviations used are: s=singlet, d=doublet, t=triplet, q=quartet, m=multiplet, br=broad, etc.

High Performance Liquid Chromatography (HPLC) Measurement

HPLC data are obtained by Waters Alliance 2695 HPLC system with 2996 PDA detector using the following conditions;

Column: XBridge Phenyl (3.5 micrometers, 4.6×150 mm),
Eluent: acetonitrile/0.3% perchloric acid=35:65,
Detection: UV at 215 nm,
Flow rate: 1 mL/min, and
Column temperature: 40° C.

Data processing is performed with Empower 3 software supplied from Waters Corporation.

Room temperature means 15 to 35° C., but not limited to that as long as the purpose is achieved.

Chemical symbols have their usual meanings; M (mol(s) per liter), L (liter(s)), mL (milliliter(s)), g (gram(s)), mg (milligram(s)), mol (moles), mmol (millimoles).

Throughout the instant application, the following abbreviations are used with the following meanings: CPME (cyclopentyl methyl ether), EtOAc (ethyl acetate), EtOH (ethanol), MeCN (acetonitrile), MEK (methyl ethyl ketone), MeOH (methanol), 2-MeTHF (2-Methyltetrahydrofuran), MTBE (t-butyl methyl ether), THF (Tetrahydrofuran), DMF (N,N-dimethylformamide).

For other studies, the crystalline forms of the invention can be distinguished by polarized light microscopy (PLM), scanning electron microscopy (SEM), hot stage optical microscopy, electron crystallography, single crystal X-ray diffractometry, quantitative analysis, particle size analysis (PSA) (e.g., particle size, particle size distribution (PSD), and particle shape), specific surface area (SSA) analysis, surface energy analysis (e.g., inverse gas chromatography or IGC), by dissolution studies, or a combination of these techniques.

Example 1

Preparation of (R)—N—((S)-1-(4-(3,3-dimethyl-2-oxoindolin-1-yl)piperidin-1-yl)-1-oxo-4-phenylbutan-2-yl)piperidine-3-carboxamide This compound is synthesized according to the conventional process described at Example 1 in WO2010/098145.

Example 2

[Preparation of (R)—N—((S)-1-(4-(3,3-dimethyl-2-oxoindolin-1-yl)piperidin-1-yl)-1-oxo-4-phenylbutan-2-yl)piperidine-3-carboxamide Amorphous Solid of Hydrochloride (HCl-Salt Amorphous)]

(R)—N—((S)-1-(4-(3,3-dimethyl-2-oxoindolin-1-yl)piperidin-1-yl)-1-oxo-4-phenylbutan-2-yl)piperidine-3-carboxamide obtained according to the method of EXAMPLE 1 (50 mg, 97 micromol) is dissolved in ethyl acetate (0.75 mL) and to which 4 N hydrochloric acid in ethyl acetate (32 microL, 126 micromol) is added. After t-butyl methyl ether (2.0 mL) is added to the mixture, a precipitated solid is collected by suction to afford HCl salt as a white powder (46 mg, 83 micromol, 85% yield). Another batch (38 mg, 69 micromol) is prepared by the same method and the combined white powder (84 mg, 152 micromol) is completely dissolved in dichloromethane (5 mL). After the solvent is removed by evaporation, the obtained solid is dried at room temperature under reduced pressure to afford amorphous solid of hydrochloride (73 mg, 132 micromol, 87% recovery).

Example 3

[Preparation of (R)—N—((S)-1-(4-(3,3-dimethyl-2-oxoindolin-1-yl)piperidin-1-yl)-1-oxo-4-phenylbutan-2-yl)piperidine-3-carboxamide hydrochloride Crystalline Form A (HCl-salt Crystalline Form A)]

Preparation Method 1:

4N—HCl in ethyl acetate (2.25 mL, 8.9 mmol) is added to (R)—N—((S)-1-(4-(3,3-dimethyl-2-oxoindolin-1-yl)piperidin-1-yl)-1-oxo-4-phenylbutan-2-yl)piperidine-3-carboxamide obtained according to the method of EXAMPLE 1 (3.83 g, 7.41 mmol) in ethyl acetate (30 mL) at 0° C. and volatiles are removed in vacuo to give (R)—N—((S)-1-(4-(3,3-dimethyl-2-oxoindolin-1-yl)piperidin-1-yl)-1-oxo-4-phenylbutan-2-yl)piperidine-3-carboxamide HCl-salt as a gum-like stuff. After the gum-like stuff is dissolved in ethyl acetate (60 mL) with heating, the mixture is cooled to room temperature and to give colorless suspension-solids. The mixture is stirred at 40° C. under nitrogen overnight to give a yogurt-like stuff. Volatiles are removed in vacuo to give colorless solids (4.04 g, 7.30 mmol) as HCl-salt partial crystals.

To the solution of the HCl-salt partial crystals (186 mg) in 2% aqueous tetrahydrofuran (5 mL) is added ethyl acetate (5 mL) and the above solid of HCl-salt partial crystals as a role for seed crystals. The mixture is gently stirred at room temperature for about 5 min, and then the mixture is stirred at 60° C. overnight. Precipitates are filtered, washed with ethyl acetate and dried in a vacuo at 50° C. to give solids (175 mg) as HCl-salt Crystalline Form A.

The symbol "c", "0", "S" and "v" are written as "alpha", "theta", "delta" and "nu", respectively in this specification.

$^1$H-NMR (CDCl$_3$) delta: 9.81-9.47 (1H, br), 7.55 (1H, dd, J=8.1, 3.6 Hz), 7.30-7.14 (5H, m), 7.07-6.85 (3H, m), 4.92-4.83 (1H, m), 4.78-4.69 (1H, m), 4.47-4.26 (1H, m), 3.95-3.82 (1H, m), 3.72-3.57 (1H, m), 3.51-3.41 (1H, m), 3.18-2.55 (7H, m), 2.46-1.58 (10H, m), 1.35 (3H, s), 1.33 (3H, s).

MS (ESI) m/z: 517 (M+H)$^+$.

Crystallinity by XRPD: HCl-salt Crystalline Form A (FIG. 1). Main peaks at 2-Theta 4.0, 7.9, 14.7, 17.5, and 22.3 (°); further in detail at 2-Theta 4.0, 7.9, 13.6, 14.7, 15.7, 16.7, 17.5, 22.3, 25.5, 27.1 and 31.7 (°). Each peak has a margin of error of +/−0.2 (°).

m.p. (DSC onset): (FIG. 2). Endothermic peak shows that onset temperature is 254° C. and peak temperature is 257° C. Each temperature has a margin of error of +/−1° C.

IR (KBr): (FIG. 3). Absorption bands at 3327, 2926, 1707, 1668, 1616, and 700 cm$^{-1}$; further in detail at 4047, 3971, 3327, 2926, 2758, 2712, 2621, 2523, 2490, 2401, 2120, 1952, 1898, 1707, 1668, 1616, 1460, 1385, 1358, 1306, 1250, 1223, 1119, 1061, 1051, 990, 953, 912, 745, 700, 631, 561, and 494 cm$^{-1}$. Each peak has a margin of error of +/−2 cm$^{-1}$.

Anal. Calcd for $C_{31}H_{41}ClN_4O_3$: C, 67.3; H, 7.5; Cl, 6.4; N, 10.1. Found; C, 66.8; H, 7.5; Cl, 6.4; N, 10.0.

Example 4

[Preparation of (R)—N—((S)-1-(4-(3,3-dimethyl-2-oxoindolin-1-yl)piperidin-1-yl)-1-oxo-4-phenylbutan-2-yl)piperidine-3-carboxamide hydrochloride Crystalline Form A (HCl-salt Crystalline Form A)]

Preparation Method 2:

(R)—N—((S)-1-(4-(3,3-dimethyl-2-oxoindolin-1-yl)piperidin-1-yl)-1-oxo-4-phenylbutan-2-yl)piperidine-3-carboxamide amorphous solid of hydrochloride (HCl-salt Amorphous) obtained according to the method of EXAMPLE 2 (40.5 g, 73.1 mmol) is added portionwise to 2% aqueous tetrahydrofuran (102 mL) and further 2% aqueous tetrahydrofuran (204 mL) is added to the mixture to afford a clear solution at 60° C. Ethyl acetate (400 mL) is added to the solution and the resulting mixture is stirred at 60° C. for 5 min. After seed (HCl-salt Crystalline Form A prepared in Preparation method 1 of EXAMPLE 3 (20 mg)) is added to the mixture is stirred at 50° C. for 1 hour, and then at 40° C. for 1 hour and room temperature overnight. Precipitates are filtered, washed with ethyl acetate and dried in a vacuum oven at 50° C. for 6 hour to afford (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form A (37.7 g, 68.2 mmol, 93% recovery) as a solid.

Thus the procedure described in Example 4 is preferable for obtaining the HCl-salt Crystalline Form A for practical use as a pharmaceutical acceptable salt. The procedure also perform not only with the solvents used in above example, but also with MTBE, the hydrochloric acid solution in dioxane, water/EtOH, or other solvent. The same signals as described in Preparation method 1 of EXAMPLE 3 are observed in XRPD, m.p. (DSC onset) and IR (KBr).

Example 5

[Preparation of (R)—N—((S)-1-(4-(3,3-dimethyl-2-oxoindolin-1-yl)piperidin-1-yl)-1-oxo-4-phenylbutan-2-yl)piperidine-3-carboxamide hydrochloride Crystalline Form A (HCl-salt Crystalline Form A)]

Large Scale (1 kg Scale):

1.2 kg of HCl-salt Crystalline Form A is prepared from (R)-tert-butyl 3-((S)-1-(4-(3,3-dimethyl-2-oxoindolin-1-yl)piperidin-1-yl)-1-oxo-4-phenylbutan-2-yl carbamoyl)piperidine-1-carboxylate obtained according to the conventional process described at Example 1 in WO2010/098145 (1.5 kg, 2.5 mol) in ethyl acetate with heating at 70° C., and using concentrated HCl (217 mL, 1.04 eq.).

Example 6

[Preparation of (R)—N—((S)-1-(4-(3,3-dimethyl-2-oxoindolin-1-yl)piperidin-1-yl)-1-oxo-4-phenylbutan-2-yl)piperidine-3-carboxamide hydrochloride Crystalline Form B (HCl-salt Crystalline Form B)]

(R)—N—((S)-1-(4-(3,3-dimethyl-2-oxoindolin-1-yl)piperidin-1-yl)-1-oxo-4-phenylbutan-2-yl)piperidine-3-carboxamide obtained according to the method of EXAMPLE 1 (9.8 g, 18 mmol) in THF (250 mL, 25 vol) and deionized water (1 mL) is heated to 60° C. and further deionized water (3.2 mL) is added portionwise until a solid is completely dissolved. Ethyl acetate (150 mL, 15 vol) is added dropwise over a period of 30 min at 60° C. White solid appears after the addition of about 50 mL of ethyl acetate. After the mixture is stirred at 60° C. for 17 hours, cooled to room temperature at a rate of 5° C. by 30 min and stirred at 5° C. for 1 hour. The solid is filtered, washed with anhydrous ethyl acetate (2×10 mL) and dried in a vacuum oven at 50° C. for 3 hours to give (R)—N—((S)-1-(4-(3,3-dimethyl-2-oxoindolin-1-yl)piperidin-1-yl)-1-oxo-4-phenylbutan-2-yl)piperidine-3-carboxamide HCl-salt Crystalline Form B (5.8 g, 10 mmol, 59% recovery) as a solid.

Crystallinity by XRPD: HCl-salt Crystalline Form B (FIG. 4). Main peaks at 2-Theta 4.0, 7.9, 15.7, 17.9, 19.8, and 21.6 (°); further in detail at 2-Theta 4.0, 7.9, 15.7, 17.9, 19.8, 21.6, 25.5 and 31.7 (°). Each peak has a margin of error of +/−0.2 (°). m.p. (DSC onset): (FIG. 5). Endothermic peak shows that onset temperature is 258° C. and peak temperature is 260° C. Each temperature has a margin of error of +/−1° C.

IR (KBr): (FIG. 6). Absorption bands at 3327, 2926, 1707, 1670, 1616, and 700 cm$^{-1}$; further in detail at 4049, 3971, 3327, 2926, 2758, 2712, 2621, 2523, 2490, 2401, 2120, 1952, 1898, 1707, 1670, 1616, 1458, 1385, 1356, 1306, 1254, 1221, 1117, 1059, 989, 955, 910, 750, 700, 631, 563, 544, 519, and 494 cm$^{-1}$. Each peak has a margin of error of +/−2 cm$^{-1}$ When HCl-salt Crystalline Form A obtained according to the method of EXAMPLE 3, 4 or 5 contains HCl-salt Crystalline Form B, a suspension of HCl-salt Crystalline Form A and Form B in ethyl acetate is stirred using a stir bar at room temperature or 60° C. for 6 days, then HCl-salt Crystalline Form B converts to HCl-salt Crystalline Form A completely to give only HCl-salt Crystalline Form A.

No noticeable conversion of HCl-salt Crystalline Form A to Form B and significant conversion of HCl-salt Crystalline Form B to Form A are observed in ethyl acetate and/or a mixture of THF-water-ethyl acetate (1:0.04:3) at 60° C. and no HCl-salt Crystalline Form B appears by seeding of HCl-salt Crystalline Form B to a solution of HCl-salt in THF-water at 5, 25, and 60° C.

Example 7

[Hygroscopicity Study]

The hygroscopicity study is performed by using dynamic vapor sorption (DVS) analysis. The following Table 1 show that weight gain % of HCl-salt Crystalline Form A, HCl-salt Crystalline Form B, HCl-salt Amorphous and Free-base Amorphous disclosed in the prior art WO2010/098145.

HCl-salt Crystalline Form A and Form B absorb less than or equal to 3.4 wt % and 8.6 wt % of water under 90% relative humidity (RH) at 25° C., respectively. On the other hand, HCl-salt Amorphous and Free-base Amorphous absorb 20.5 wt % and 17.9 wt % of water under 90% RH at 25° C., respectively. Thus HCl-salt Amorphous and Free-base Amorphous are found to be much more hygroscopic than HCl-salt Crystalline Form A and Form B.

TABLE 1

|  | 50% RH | 60% RH | 70% RH | 80% RH | 90% RH |
|---|---|---|---|---|---|
| HCl-salt Crystalline Form A | 0.0 | 0.2 | 0.4 | 1.6 | 3.4 |
| HCl-salt Crystalline Form B | 0.0 | 0.0 | 0.0 | 4.9 | 8.6 |

TABLE 1-continued

|  | 50% RH | 60% RH | 70% RH | 80% RH | 90% RH |
|---|---|---|---|---|---|
| HCl-salt Amorphous | 5.2 | 7.6 | 9.4 | 13.3 | 20.5 |
| Free-base Amorphous | 5.2 | 7.1 | 9.5 | 11.7 | 17.9 |

Example 8

[Stability Study]

Solid-state stability study is performed using Nagano Science Constant temperature/humidity control chamber LH-20-11M, LH-21-11M, LTL-200D3CJ-14 or LTX-01. The samples are placed in the chamber and exposed under 25° C./60% RH, 40° C./75% RH and/or irradiated with the light such as D65 lamp or Xenon lamp. The crystalline form, thermal behavior, purity and/or weight change of the resultant sample after the exposure or irradiation are evaluated by XRPD, TG/DTA or DSC, HPLC, microbalance, respectively.

In the solid-state stability study under accelerated conditions at 40° C./75% RH, the samples picked up at 26 and 50 days after exposure, in the case of HCl-salt Crystalline Form A, no other arising degradation products except for existing the degradation ones at initial sample (Day 0) appears after storage of 50 days. However, in the case of HCl-salt Amorphous and Free-base Amorphous, other arising degradation products in the storage period of 50 days are found one product (with retention time 9.6 min) and four products (with retention times 3.7, 9.6, 13.1 and 21.3, respectively), and the remainings are reduced to 97.0% and 97.2%, respectively.

HCl-salt Crystalline Form A is found to be stable comparing with HCl-salt Amorphous and Free-base Amorphous disclosed in the prior art WO2010/098145.

Example 9

[Photostability Study]

Photostability samples are set in Nagano Science LTL-200D3CJ-14. The samples are placed in the chamber and stored under 25° C./60% RH condition and irradiated with a D65 lamp on light condition of 4000 lux. HCl-salt Crystalline Form A, HCl-salt Amorphous, and Free-base Amorphous samples store for 13, 26 and 50 days under the condition are analyzed by HPLC, respectively.

FIGS. 7, 8 and 9 show the data of degradation products except for the existing products at initial samples (Day 0), i.e., definitely arising peaks on the HPLC chart after storing initial samples under light exposure. The relative retention time (RRT) represents a ratio of retention time (RT) of a target peak to RT of the main peak. In case of the appearance of the peak at same RRT at least two consecutive storing periods of 13, 26 and 50 days, the arising peak is recognized as a degradation product.

As shown in FIG. 7, HCl-salt Amorphous has arising degradation products as to 2, 5 and 5 peaks due to the irradiating light at storing periods of 13, 26 and 50 days, respectively.

As shown in FIG. 8, Free-base Amorphous has arising degradation products as 2, 4 and 4 peaks due to the irradiating light at storing periods of 13, 26 and 50 days, respectively.

As shown in FIG. 9, HCl-salt Crystalline Form A has no arising degradation products due to the irradiating light.

Example 10

[Solubility Study]

Each 5 mg of HCl-salt Crystalline Form A was weighed in a vial and each 20 microL of buffers (pH 1.06, 2.98, 4.44, 7.34, 7.40 and 9.22) and WFI (water for injection) was added to the vial. After the mixture was shaken with a vortex mixer and stood still for 15 min, no insoluble matter was observed. The mixture kept a clear solution after still standing for 2 days.

HCl-salt Crystalline Form A shows a good solubility (>250 mg/mL) in any buffers.

Example 11

[Chiral Analysis]

High Performance Liquid Chromatography (HPLC) measurement

HPLC data are obtained by Waters Alliance 2695 HPLC system with 2996 PDA detector using the following conditions;

Column: DAICEL CHIRALPAK IC (5 micrometers, 4.6×250 mm),

Eluent: n-hexane/ethanol/diethylamine=87/13/0.1 (v/v/v),

Detection: UV at 254 nm,

Flow rate: 1 mL/min, and

Column temperature: 40° C.

Data processing is performed with Empower 3 software supplied from Waters Corporation HCl-salt Crystalline Form A and HCl-salt Crystalline Form B in the present invention show preferable stability, which show the above-mentioned practical use.

Example 12

[Static-Electricity Inducibility Study]

Considering that materials with high inducibility of static-electricity are generally difficult to handle under the conditions of the pharmaceutical technology, and in particular under the pharmacological conditions for conventional industrial crude drugs, and are also not easily realized as drugs with uniform content, the static-electricity inducibility of the tested crystalline in the present invention shows preferable results, which show the above mentioned practical use. The testing is performed with conventional method.

Example 13

[In Vitro Pharmacological Assay]

Motilin receptor agonistic activity is identified by reporter gene assay using the cell expressing motilin receptor and reporter gene. The dose-response curve of assay sample is plotted and calculated to determine an agonistic activity ($EC_{50}$). HCl-salt Crystalline Form A shows high potency consistent with initial sample.

In summary, HCl-salt Crystalline Form A and Form B have significantly lower hygroscopicity and the HCl-salt Crystalline Form A is more suppressed decomposition from light as compared to that in HCl-salt Amorphous and Free-base Amorphous. HCl-salt Crystalline Form A shows storage stability. During the storage period, no significant changes in the appearance, XRPD, IR (KBr), m.p. (DSC onset) and potency of HCl-salt Crystalline Form A are observed.

Reference Example 1

General Procedure for Preparation of (R)—N—((S)-1-(4-(3,3-dimethyl-2-oxoindolin-1-yl)piperidin-1-yl)-1-oxo-4-phenylbutan-2-yl)piperidine-3-carboxamide salt A solution of (R)—N—((S)-1-(4-(3,3-dimethyl-2-oxoindolin-1-yl)piperidin-1-yl)-1-oxo-4-phenylbutan-2-yl)piperidine-3-carboxamide (approximately 25 mg) in EtOH, THF, MTBE, MeCN, MEK, or EtOAc, etc is allowed to equilibrate at elevated temperature (50° C.-70° C.) for approximately five minutes before counter ion solution is added. The counter ion solution in MeCN, EtOH, MEK, THF, DMSO, dioxane and/or water, etc is added at a volume corresponding to 1.05 molar equivalents of each mixture and the resulting mixture is then cooled slowly at 20° C./hour to ambient temperature and allowed to equilibrate overnight. Any precipitate is isolated via vacuum filtration and dried overnight under vacuum at ambient temperature.

Reference Example 1(A)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide benzenesulfonic acid salt Trial of salt formation with benzenesulfonic acid is conducted by the above general procedure using the said compound in MeCN and benzenesulfonic acid solution in MeCN. The mixture is clear after an addition of the counter ion. After the solution is evaporated to dryness, oil is obtained and no solid is obtained.

When the said compound in EtOAc and benzenesulfonic acid solution in MeCN is used for salt formation with benzenesulfonic acid by the above general procedure, oil is obtained and no solid is obtained.

Reference Example 1(b)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide citric acid salt Trial of salt formation with citric acid is conducted by the above general procedure using the said compound in MeCN and citric acid solution in MeCN. The mixture is clear after an addition of the counter ion. After the solution is evaporated to dryness, oil is obtained and no solid is obtained.

When the said compound in EtOAc and citric acid solution in EtOH is used for salt formation with citric acid by the above general procedure, oil is obtained and no solid is obtained.

Reference Example 1(c)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide L-malic acid salt Trial of salt formation with L-malic acid is conducted by the above general procedure using the said compound in MeCN and L-malic acid solution in MeCN. The mixture is clear after an addition of the counter ion. After the solution is evaporated to dryness, oil is obtained and no solid is obtained.

When the said compound in EtOAc and L-malic acid solution in EtOH is used for salt formation with L-malic acid by the above general procedure, oil is obtained and no solid is obtained.

Reference Example 1(d)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide L-tartaric acid salt Trial of salt formation with L-tartaric acid is conducted by the above general procedure using the said compound in MeCN and L-tartaric acid solution in EtOH. The mixture is clear after an addition of the counter ion. After the solution is evaporated to dryness, which is evaluated by XRPD analysis and found to provide amorphous. No crystal salt is obtained.

Reference Example 1(e)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide p-toluenesulfonic acid salt Trial of salt formation with p-toluenesulfonic acid salt is conducted by the above general procedure using the said compound in EtOAc and p-toluenesulfonic acid solution in MeCN. The mixture is clear after an addition of the counter ion. After the solution is evaporated to dryness, which is evaluated by XRPD analysis and found to provide amorphous. No crystal salt is obtained.

Reference Example 1(f)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide naphthalene-2-sulfonic acid salt Trial of salt formation with naphthalene-2-sulfonic acid salt is conducted by the above general procedure using the said compound in MeCN and naphthalene-2-sulfonic acid solution in MeCN. The mixture is clear after an addition of the counter ion. After the solution is evaporated to dryness, which is evaluated by XRPD analysis and found to provide amorphous. No crystal salt is obtained.

Reference Example 1(g)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide sulfuric acid salt Trial of salt formation with sulfuric acid is conducted by the above general procedure using the said compound in MTBE and sulfuric acid solution in EtOH. The mixture is clear after an addition of the counter ion. After the solution is evaporated to dryness, oil is obtained and no solid is obtained.

Reference Example 1(h)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide ethanesulfonic acid salt Trial of salt formation with ethanesulfonic acid is conducted by the above general procedure using the said compound in MEK and ethanesulfonic acid solution in MEK. The mixture is clear after an addition of the counter ion. After the solution is evaporated to dryness, oil is obtained and no solid is obtained.

When EtOH is used for salt formation with ethanesulfonic acid instead of MEK, oil is obtained and no solid is obtained.

Reference Example 1(i)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide methanesulfonic acid salt (mesylate salt)

Trial of salt formation with methanesulfonic acid is conducted by the above general procedure using the said compound in MeCN and methanesulfonic acid solution in MeCN. The mixture is clear after an addition of the counter ion. After the solution is evaporated to dryness, oil is obtained and no solid is obtained.

On the other hand, when the said compound in MTBE and methanesulfonic acid solution in MeCN is used for salt formation with methanesulfonic acid by the above general procedure, the mixture is clear after an addition of the counter ion. After the solution is evaporated to dryness, which is evaluated by XRPD analysis and found to provide mesylate salt crystalline.

However, in the similar manner as hygroscopicity study described in Example 7, water adsorption of the mesylate salt crystalline shows 3.7 wt % at 60% RH and 16.9 wt % at 90% RH.

In the similar manner as chiral analysis in Example 11, mesylate salt crystalline shows a mixture of R,S- and R,R-isomers present (79:21). And then, analysis of post isothermal hold material provides a chiral purity of 93% (R,S- and R,R-isomers present (93:7). However both samples from before and after isothermal stress are spiked with the R,R-isomer and analyzed, the retention times are not consistent with R,R-isomer retention time. The cause of this inconsistency is unclear and possible reasons for retention time changes include peak splitting, degradation, and retention time shifts.

Thus the mesylate salt crystalline is not for practical use as a pharmaceutical acceptable salt.

Reference Example 1(j)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide hippuric acid salt (hippurate salt)

Trial of salt formation with hippuric acid is conducted by the above general procedure using the said compound in MeCN and hippuric acid solution in EtOH. The mixture is clear after an addition of the counter ion. After the solution is evaporated to dryness, oil is obtained and no solid is obtained.

When the said compound in MEK and hippuric acid solution in MEK is used for salt formation with hippuric acid by the above general procedure, the mixture is clear after an addition of the counter ion. After the solution is evaporated to dryness, which is evaluated by XRPD analysis and found to provide hippurate salt crystalline.

However, in the similar manner as hygroscopicity study described in Example 7, water adsorption of the hippurate salt crystalline shows 16.0 wt % at 90% RH and partial deliquescence is observed.

XRPD analysis of post hygroscopicity study material provides amorphous material. $^1$H-NMR analysis of post hygroscopicity study material shows a decrease of MEK amount of to 1.6 wt %. The formation of amorphous material and concurrent loss of MEK post DVS analysis is consistent with the hippurate salt as an MEK solvate.

Thus the hippurate salt crystalline is not for practical use as a pharmaceutical acceptable salt.

Reference Example 1(k)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide hydrochloric acid salt (hydrochloride)

Trial of salt formation with hydrochloric acid is conducted by the above general procedure using the said compound in MeCN and hydrochloric acid solution in water/EtOH. The mixture is clear after an addition of the counter ion. After the solution is evaporated to dryness, which is evaluated by XRPD analysis and found to provide amorphous. No crystal salt is obtained.

When the said compound in MeCN and hydrochloric acid solution in dioxane is used for salt formation with hydrochloric acid by the above general procedure, the mixture is clear after an addition of the counter ion. After the solution is evaporated to dryness, which is evaluated by XRPD analysis and found to provide amorphous. No crystal salt is obtained.

Reference Example 1(l)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide phosphoric acid salt Trial of salt formation with phosphoric acid is conducted by the above general procedure using the said compound in MeCN and phosphoric acid solution in EtOH. The mixture is clear after an addition of the counter ion. After the solution is evaporated to dryness, oil is obtained and no solid is obtained.

When the said compound in EtOAc and phosphoric acid solution in EtOH is used for salt formation with phosphoric acid by the above general procedure, oil is obtained and no solid is obtained.

And then, the oil is dissolved in MeCN and to which is added MTBE. The solution is faintly cloudy and filterable solid is obtained. However, it could not be isolated in sufficient quantities for analysis.

Reference Example 1(m)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide D-gluconic acid salt Trial of salt formation with D-gluconic acid is conducted by the above general procedure using the said compound in MTBE and D-gluconic acid solution in dioxane/water (volume ratio of 4:1). The mixture is 2 layers after an addition of the counter ion. After the solution is evaporated to dryness, which is evaluated by XRPD analysis and found to provide amorphous. No crystal salt is obtained.

Reference Example 1(n)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide 1-hydroxy-2-napthoic acid salt Trial of salt formation with 1-hydroxy-2-napthoic acid is conducted by the above general procedure using the said compound in MEK and 1-hydroxy-2-napthoic acid solution in MEK. The mixture is clear after an addition of the counter ion. After the solution is evaporated to dryness, which is evaluated by XRPD analysis and found to provide amorphous. No crystal salt is obtained.

Reference Example 1(o)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide L-pyroglutamic acid salt Trial of salt formation with L-pyroglutamic acid is conducted by the above general procedure using the said compound in EtOAc and L-pyroglutamic acid solution in EtOH. The mixture is clear after an addition of the counter ion. After the solution is evaporated to dryness, which is evaluated by XRPD analysis and found to provide amorphous. No crystal salt is obtained.

Reference Example 1(p)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide L-lactic acid salt Trial of salt formation with L-lactic acid is conducted by the above general procedure using the said compound in MeCN and L-lactic acid solution in MeCN. The mixture is clear after an addition of the counter ion. After the solution is evaporated to dryness, oil is obtained and no solid is obtained.

When the said compound in EtOAc and L-lactic acid solution in EtOH is used for salt formation with L-lactic acid by the above general procedure, the mixture is 2 layers after an addition of the counter ion. After the solution is evaporated to dryness, oil is obtained and no solid is obtained.

Reference Example 1(q)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide glutaric acid salt Trial of salt formation with glutaric acid is conducted by the above general procedure using the said compound in MEK and glutaric acid solution in MEK. The mixture is clear after an addition of the counter ion. After the solution is evaporated to dryness, oil is obtained and no solid is obtained.

Reference Example 1(r)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide pamoic acid salt Trial of salt formation with pamoic acid is conducted by the above general procedure using the said compound in EtOAc and pamoic acid solution in DMSO. The mixture is clear after an addition of the counter ion. After the solution is evaporated to dryness, oil is obtained and no solid is obtained.

Reference Example 1(s)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide nicotinic acid salt Trial of salt formation with nicotinic acid is conducted by the above general procedure using the said compound in MEK and nicotinic acid solution in DMSO. The mixture is clear after an addition of the counter ion. After the solution is evaporated to dryness, oil is obtained and no solid is obtained.

Reference Example 1(t)

Preparation of (R)—N—((S)-1-(4-(3,3-dimethyl-2-oxoindolin-1-yl)piperidin-1-yl)-1-oxo-4-phenylbutan-2-yl)piperidine-3-carboxamide sebacic acid salt Trial of salt formation with sebacic acid is conducted by the above general procedure using the said compound in THF and sebacic acid solution in THF. The mixture is clear after an addition of the counter ion. After the solution is evaporated to dryness, oil is obtained and no solid is obtained.

The invention claimed is:

1. (R)—N—((S)-1-(4-(3,3-dimethyl-2-oxoindolin-1-yl)piperidin-1-yl)-1-oxo-4-phenylbutan-2-yl)piperidine-3-carboxamide HCl Crystalline Form A which is characterized by an X-ray powder diffraction (XRPD) pattern obtained by irradiation with copper K-alpha (Cu Kα) radiation comprising peaks at 14.7±0.2 and 17.5±0.2 degrees two-theta.

2. The (R)—N-((S)-1-(4-(3,3-dimethyl-2-oxoindolin-1-yl) piperidin-1-yl)-1-oxo-4-phenylbutan-2-yl) piperidine-3-carboxamide HCl Crystalline Form A according to claim 1, wherein the X-ray powder diffraction (XRPD) pattern obtained by irradiation with copper K-alpha (Cu Kα) radiation further comprises peaks at 4.0±0.2, 7.9±0.2, and 22.3±0.2 degrees two-theta.

3. The (R)—N-((S)-1-(4-(3,3-dimethyl-2-oxoindolin-1-yl) piperidin-1-yl)-1-oxo-4-phenylbutan-2-yl) piperidine-3-carboxamide HCl Crystalline Form A according to claim 1, further characterized by a differential scanning calorimetry (DSC) thermogram exhibiting an endothermic onset temperature of 254+1° C.

4. The (R)—N-((S)-1-(4-(3,3-dimethyl-2-oxoindolin-1-yl) piperidin-1-yl)-1-oxo-4-phenylbutan-2-yl) piperidine-3-carboxamide HCl Crystalline Form A according to claim 1, further characterized by an infrared (IR) spectrum in KBr which shows absorption bands at 3327±2, 2926±2, 1707±2, 1668±2, 1616±2, and 700±2 cm$^{-1}$.

5. (R)—N-((S)-1-(4-(3,3-dimethyl-2-oxoindolin-1-yl) piperidin-1-yl)-1-oxo-4-phenylbutan-2-yl) piperidine-3-carboxamide HCl Crystalline Form B which is characterized by an X-ray powder diffraction (XRPD) pattern obtained by irradiation with copper K-alpha (Cu Kα) radiation comprising peaks at 19.8±0.2 and 21.6±0.2 degrees two-theta.

6. The (R)—N-((S)-1-(4-(3,3-dimethyl-2-oxoindolin-1-yl) piperidin-1-yl)-1-oxo-4-phenylbutan-2-yl) piperidine-3-carboxamide HCl Crystalline Form B according to claim 5, wherein the X-ray powder diffraction (XRPD) pattern obtained by irradiation with copper K-alpha (Cu Kα) radiation further comprises peaks at 4.0±0.2, 7.9±0.2, 15.7±0.2, and 17.9±0.2 degrees two-theta.

7. The (R)—N-((S)-1-(4-(3,3-dimethyl-2-oxoindolin-1-yl) piperidin-1-yl)-1-oxo-4-phenylbutan-2-yl) piperidine-3-carboxamide HCl Crystalline Form B according to claim 5, further characterized by a differential scanning calorimetry (DSC) thermogram exhibiting an endothermic onset temperature of 258+1° C.

8. A pharmaceutical composition comprising (R)—N-((S)-1-(4-(3,3-dimethyl-2-oxoindolin-1-yl) piperidin-1-yl)-1-oxo-4-phenylbutan-2-yl) piperidine-3-carboxamide HCl Crystalline Form A according to claim 1, together with one or more pharmaceutically acceptable carriers or excipients.

9. The pharmaceutical composition according to claim 8, wherein the composition is a dosage form for oral, parenteral, topical, rectal, intravaginal, ocular, or aural administration.

10. The pharmaceutical composition according to claim 9, wherein the dosage form is selected from the group consisting of a tablet, soft capsule, hard capsule, lozenge, film, ovule, spray, patch, suspension, solution, syrup, elixir, modified release formulation, lotion, cream, ointment, gel, drop, foam, wafer, implant, microemulsion, injection, dry powder, and suppository.

11. A pharmaceutical composition comprising (R)—N-((S)-1-(4-(3,3-dimethyl-2-oxoindolin-1-yl) piperidin-1-yl)-1-oxo-4-phenylbutan-2-yl) piperidine-3-carboxamide HCl Crystalline Form B according to claim 5, together with one or more pharmaceutically acceptable carriers or excipients.

12. The pharmaceutical composition according to claim 11, wherein the composition is a dosage form for oral, parenteral, topical, rectal, intravaginal, ocular, or aural administration.

13. The pharmaceutical composition according to claim 12, wherein the dosage form is selected from the group consisting of a tablet, soft capsule, hard capsule, lozenge, film, ovule, spray, patch, suspension, solution, syrup, elixir, modified release formulation, lotion, cream, ointment, gel, drop, foam, wafer, implant, microemulsion, injection, dry powder, and suppository.

* * * * *